US009995936B1

(12) United States Patent
Macannuco et al.

(10) Patent No.: US 9,995,936 B1
(45) Date of Patent: Jun. 12, 2018

(54) AUGMENTED REALITY SYSTEMS HAVING A VIRTUAL IMAGE OVERLAYING AN INFRARED PORTION OF A LIVE SCENE

(71) Applicant: Lockheed Martin Corporation, Bethesda, MD (US)

(72) Inventors: David J. Macannuco, Winchester, MA (US); Wayne A. Beard, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days. days.

(21) Appl. No.: 15/142,380

(22) Filed: Apr. 29, 2016

(51) Int. Cl.
| | | |
|---|---|---|
| *G06T 11/00* | (2006.01) | |
| *G02B 27/01* | (2006.01) | |
| *G06T 19/00* | (2011.01) | |
| *H04N 5/33* | (2006.01) | |

(52) U.S. Cl.
CPC ........ *G02B 27/0172* (2013.01); *G06T 19/006* (2013.01); *H04N 5/33* (2013.01); *G02B 2027/014* (2013.01); *G02B 2027/0118* (2013.01); *G02B 2027/0138* (2013.01)

(58) Field of Classification Search
None
See application file for complete search history.

(56) References Cited

U.S. PATENT DOCUMENTS

| | | |
|---|---|---|
| 3,880,509 A | 4/1975 | Herndon |
| 4,026,641 A | 5/1977 | Bosserman et al. |
| 4,176,468 A | 12/1979 | Marty, Jr. |

(Continued)

FOREIGN PATENT DOCUMENTS

| | | |
|---|---|---|
| CA | 2750287 A1 | 11/2011 |
| CA | 2750287 C | 11/2011 |

(Continued)

OTHER PUBLICATIONS

Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.

(Continued)

*Primary Examiner* — Barry Drennan
*Assistant Examiner* — Jason Pringle-Parker
(74) *Attorney, Agent, or Firm* — Withrow & Terranova, PLLC

(57) ABSTRACT

A head-mounted display (HMD) for an augmented reality system allows a user to view an augmented scene comprising a real-world portion of a live scene combined with virtual images overlaying an infrared (IR) portion of the live scene. The HMD includes a head-wearable frame, a lens defining a user field of view (FOV), and a camera. The lens permits the user to view a live scene corresponding to the user FOV, and the camera is configured to capture a captured image of the live scene containing data indicative of an infrared (IR) portion of the live scene. The IR portion of the live scene includes reflected IR light above a predetermined threshold, such as an IR reflective background surface in a simulation environment. Based on the IR portion, a virtual image is displayed on an interior surface of the lens so that the virtual image overlays the IR portion.

17 Claims, 8 Drawing Sheets

(56) References Cited

U.S. PATENT DOCUMENTS

| | | | |
|---|---|---|---|
| 4,293,196 | A | 10/1981 | Hilbert |
| 4,406,532 | A | 9/1983 | Howlett |
| H000423 | H | 2/1988 | Mohon et al. |
| 5,184,250 | A | 2/1993 | Lacroix |
| 5,253,116 | A | 10/1993 | Lacroix |
| 5,309,169 | A | 5/1994 | Lippert |
| 5,325,386 | A | 6/1994 | Jewell et al. |
| 5,347,400 | A | 9/1994 | Hunter |
| 5,388,990 | A | 2/1995 | Beckman |
| 5,436,763 | A | 7/1995 | Chen et al. |
| 5,561,538 | A | 10/1996 | Kato et al. |
| 5,572,343 | A | 11/1996 | Okamura et al. |
| 5,581,271 | A | 12/1996 | Kraemer |
| 5,641,288 | A | 6/1997 | Zaenglein, Jr. |
| 5,699,194 | A | 12/1997 | Takahashi |
| 5,701,132 | A | 12/1997 | Kollin et al. |
| 5,701,202 | A | 12/1997 | Takahashi |
| 5,712,649 | A | 1/1998 | Tosaki |
| 5,714,967 | A | 2/1998 | Okamura et al. |
| 5,715,094 | A | 2/1998 | Ansley et al. |
| 5,754,344 | A | 5/1998 | Fujiyama |
| 5,757,544 | A | 5/1998 | Tabata et al. |
| 5,774,268 | A | 6/1998 | Takahashi |
| 5,798,738 | A | 8/1998 | Yamada |
| 5,798,739 | A | 8/1998 | Teitel |
| 5,803,738 | A | 9/1998 | Latham |
| 5,834,676 | A | 11/1998 | Elliott |
| 5,844,530 | A | 12/1998 | Tosaki |
| 5,936,663 | A | 8/1999 | Tabata et al. |
| 5,982,343 | A | 11/1999 | Iba et al. |
| 5,999,147 | A | 12/1999 | Teitel |
| 6,038,387 | A | 3/2000 | Machida |
| 6,140,979 | A | 10/2000 | Gerhard et al. |
| 6,140,980 | A | 10/2000 | Spitzer et al. |
| 6,160,666 | A | 12/2000 | Rallison et al. |
| 6,185,045 | B1 | 2/2001 | Hanano |
| 6,201,646 | B1 | 3/2001 | Togino et al. |
| 6,215,593 | B1 | 4/2001 | Bruce |
| 6,266,194 | B1 | 7/2001 | Tanijiri et al. |
| 6,347,869 | B1 | 2/2002 | Xu et al. |
| 6,407,724 | B2 | 6/2002 | Waldern et al. |
| 6,445,362 | B1 | 9/2002 | Tegreene |
| 6,504,658 | B1 | 1/2003 | Bignolles et al. |
| 6,522,474 | B2 | 2/2003 | Cobb et al. |
| 6,529,331 | B2 | 3/2003 | Massof et al. |
| 6,549,332 | B2 | 4/2003 | Kimura |
| 6,611,253 | B1 | 8/2003 | Cohen |
| 6,633,304 | B2 | 10/2003 | Anabuki et al. |
| 6,646,811 | B2 | 11/2003 | Inoguchi |
| 6,704,128 | B2 | 3/2004 | Takeyama et al. |
| 6,731,434 | B1 | 5/2004 | Hua et al. |
| 6,751,026 | B2 | 6/2004 | Tomono |
| 6,771,423 | B2 | 8/2004 | Geist |
| 6,788,442 | B1 | 9/2004 | Potin et al. |
| 6,795,042 | B1 | 9/2004 | Nagata et al. |
| 6,813,085 | B2 | 11/2004 | Richards |
| 6,829,087 | B2 | 12/2004 | Freese et al. |
| 6,873,471 | B2 | 3/2005 | Coates et al. |
| 6,919,866 | B2 | 7/2005 | Kanevsky et al. |
| 6,919,867 | B2 | 7/2005 | Sauer |
| 6,963,379 | B2 | 11/2005 | Tomono |
| 7,002,551 | B2 | 2/2006 | Azuma et al. |
| 7,009,773 | B2 | 3/2006 | Chaoulov et al. |
| 7,016,116 | B2 | 3/2006 | Dolgoff |
| 7,063,256 | B2 | 6/2006 | Anderson et al. |
| 7,068,444 | B2 | 6/2006 | Nishi |
| 7,072,096 | B2 | 7/2006 | Holman et al. |
| 7,088,516 | B2 | 8/2006 | Yagi et al. |
| 7,095,562 | B1 | 8/2006 | Peng et al. |
| 7,110,013 | B2 | 9/2006 | Ebersole et al. |
| 7,119,965 | B1 | 10/2006 | Rolland et al. |
| 7,151,639 | B2 | 12/2006 | Lung |
| 7,295,377 | B2 | 11/2007 | Edelmann |
| 7,307,791 | B2 | 12/2007 | Li et al. |
| 7,324,081 | B2 | 1/2008 | Friedrich et al. |
| 7,339,742 | B2 | 3/2008 | Amitai et al. |
| 7,385,600 | B2 | 6/2008 | Marion |
| 7,391,573 | B2 | 6/2008 | Amitai |
| 7,407,106 | B2* | 8/2008 | Yee ............... G06F 3/0488 235/454 |
| 7,432,879 | B2 | 10/2008 | Schonlau |
| 7,446,941 | B2 | 11/2008 | Fukuda |
| 7,499,217 | B2 | 3/2009 | Cakmakci et al. |
| 7,545,571 | B2 | 6/2009 | Garoutte et al. |
| 7,547,101 | B2 | 6/2009 | Fuziak, Jr. |
| 7,573,525 | B2 | 8/2009 | Yamasaki |
| 7,605,773 | B2 | 10/2009 | Janssen |
| 7,613,356 | B2 | 11/2009 | Uchiyama et al. |
| 7,623,294 | B2 | 11/2009 | Harada et al. |
| 7,626,562 | B2 | 12/2009 | Iwasaki |
| 7,663,793 | B1 | 2/2010 | Doucet |
| 7,732,694 | B2 | 6/2010 | Rosenberg |
| 7,751,122 | B2 | 7/2010 | Amitai |
| 7,765,083 | B2 | 7/2010 | Zank et al. |
| 7,804,507 | B2 | 9/2010 | Yang et al. |
| 7,812,815 | B2 | 10/2010 | Banerjee et al. |
| 7,843,403 | B2 | 11/2010 | Spitzer |
| 7,928,927 | B1 | 4/2011 | Krenz et al. |
| 7,949,295 | B2 | 5/2011 | Kumar et al. |
| 7,965,868 | B2 | 6/2011 | Roberts et al. |
| 8,046,719 | B2 | 10/2011 | Skourup et al. |
| 8,059,342 | B2 | 11/2011 | Burke |
| 8,320,217 | B1 | 11/2012 | Barger et al. |
| 8,625,200 | B2 | 1/2014 | Smith et al. |
| 8,678,282 | B1 | 3/2014 | Black et al. |
| 8,766,879 | B2 | 7/2014 | Fujikawa et al. |
| 8,781,794 | B2 | 7/2014 | Harrison et al. |
| 8,884,845 | B2 | 11/2014 | Yamazaki et al. |
| 8,928,558 | B2 | 1/2015 | Lewis et al. |
| 8,964,298 | B2 | 2/2015 | Haddick et al. |
| 9,384,594 | B2* | 7/2016 | Maciocci ............... G06F 3/011 |
| 9,551,873 | B2 | 1/2017 | Zalewski |
| 2001/0033401 | A1 | 10/2001 | Kasai et al. |
| 2001/0043163 | A1 | 11/2001 | Waldern et al. |
| 2002/0036649 | A1 | 3/2002 | Kim et al. |
| 2002/0047987 | A1 | 4/2002 | Massengill et al. |
| 2002/0094189 | A1 | 7/2002 | Navab et al. |
| 2002/0163486 | A1 | 11/2002 | Ronzani et al. |
| 2002/0181115 | A1 | 12/2002 | Massof et al. |
| 2002/0186179 | A1 | 12/2002 | Knowles |
| 2002/0196554 | A1 | 12/2002 | Cobb et al. |
| 2003/0184868 | A1 | 10/2003 | Geist |
| 2004/0008157 | A1 | 1/2004 | Brubaker et al. |
| 2004/0070839 | A1 | 4/2004 | Yagi et al. |
| 2004/0130783 | A1 | 7/2004 | Solomon |
| 2004/0174599 | A1 | 9/2004 | Dietrich |
| 2005/0046953 | A1 | 3/2005 | Repetto et al. |
| 2006/0072215 | A1 | 4/2006 | Nishi |
| 2006/0103590 | A1 | 5/2006 | Divon |
| 2006/0227067 | A1 | 10/2006 | Iwasaki |
| 2006/0281061 | A1 | 12/2006 | Hightower et al. |
| 2007/0020587 | A1 | 1/2007 | Seymore et al. |
| 2007/0097277 | A1 | 5/2007 | Hong et al. |
| 2007/0132785 | A1 | 6/2007 | Ebersole, Jr. et al. |
| 2007/0177275 | A1 | 8/2007 | McGuire, Jr. |
| 2007/0219760 | A1 | 9/2007 | Yang et al. |
| 2007/0236800 | A1 | 10/2007 | Cakmakci et al. |
| 2007/0242131 | A1 | 10/2007 | Sanz-Pastor et al. |
| 2007/0243916 | A1 | 10/2007 | Lee |
| 2007/0248283 | A1* | 10/2007 | Mack ............... G06T 19/006 382/284 |
| 2007/0273983 | A1 | 11/2007 | Hebert |
| 2008/0007181 | A1 | 1/2008 | Pickering |
| 2008/0063400 | A1 | 3/2008 | Hudson et al. |
| 2008/0071559 | A1* | 3/2008 | Arrasvuori ............... G06Q 30/06 705/26.1 |
| 2008/0123049 | A1 | 5/2008 | Volk |
| 2008/0130309 | A1 | 6/2008 | Condon et al. |
| 2008/0198459 | A1 | 8/2008 | Fergason |
| 2008/0204731 | A1 | 8/2008 | Williams |
| 2008/0309586 | A1 | 12/2008 | Vitale |
| 2009/0002574 | A1 | 1/2009 | Sorek et al. |
| 2009/0015735 | A1 | 1/2009 | Simmonds |
| 2009/0040308 | A1 | 2/2009 | Temovskiy |

(56) References Cited

U.S. PATENT DOCUMENTS

| | | |
|---|---|---|
| 2009/0112469 A1 | 4/2009 | Lapidot et al. |
| 2009/0122385 A1 | 5/2009 | Hilton |
| 2009/0153437 A1 | 6/2009 | Aharoni |
| 2009/0173788 A1 | 7/2009 | Moraites et al. |
| 2009/0174589 A1 | 7/2009 | Moraites |
| 2009/0190003 A1* | 7/2009 | Park .................. G06T 5/50 348/239 |
| 2009/0228251 A1 | 9/2009 | Cakmakci et al. |
| 2009/0238378 A1* | 9/2009 | Kikinis .............. H04N 13/0296 381/92 |
| 2010/0002154 A1 | 1/2010 | Hua |
| 2010/0018285 A1 | 1/2010 | Murphy et al. |
| 2010/0020643 A1 | 1/2010 | Barger et al. |
| 2010/0060551 A1 | 3/2010 | Sugiyama et al. |
| 2010/0103075 A1 | 4/2010 | Kalaboukis et al. |
| 2010/0103196 A1 | 4/2010 | Kumar et al. |
| 2010/0149073 A1 | 6/2010 | Chaum et al. |
| 2010/0165430 A1 | 7/2010 | Buschbeck |
| 2010/0171680 A1 | 7/2010 | Lapidot et al. |
| 2010/0175685 A1 | 7/2010 | Campbell et al. |
| 2010/0214635 A1 | 8/2010 | Sasaki et al. |
| 2010/0238161 A1 | 9/2010 | Varga et al. |
| 2010/0245387 A1 | 9/2010 | Bachelder et al. |
| 2010/0254001 A1 | 10/2010 | Jang |
| 2010/0277575 A1 | 11/2010 | Ismael et al. |
| 2010/0279255 A1 | 11/2010 | Williams, II |
| 2010/0321409 A1 | 12/2010 | Komori et al. |
| 2011/0018903 A1 | 1/2011 | Lapstun et al. |
| 2011/0057863 A1 | 3/2011 | Sugihara et al. |
| 2011/0130636 A1 | 6/2011 | Daniel et al. |
| 2011/0202306 A1 | 8/2011 | Eng et al. |
| 2011/0213664 A1 | 9/2011 | Osterhout et al. |
| 2011/0214082 A1 | 9/2011 | Osterhout et al. |
| 2011/0216060 A1* | 9/2011 | Weising ............... G09G 5/08 345/419 |
| 2011/0221656 A1 | 9/2011 | Haddick et al. |
| 2011/0221657 A1 | 9/2011 | Haddick et al. |
| 2011/0221658 A1 | 9/2011 | Haddick et al. |
| 2011/0221659 A1 | 9/2011 | King, III et al. |
| 2011/0221668 A1 | 9/2011 | Haddick et al. |
| 2011/0221669 A1 | 9/2011 | Shams et al. |
| 2011/0221670 A1 | 9/2011 | King, III et al. |
| 2011/0221671 A1 | 9/2011 | King, III et al. |
| 2011/0221672 A1 | 9/2011 | Osterhout et al. |
| 2011/0221793 A1 | 9/2011 | King, III et al. |
| 2011/0221896 A1 | 9/2011 | Haddick et al. |
| 2011/0221897 A1 | 9/2011 | Haddick et al. |
| 2011/0222745 A1 | 9/2011 | Osterhout et al. |
| 2011/0225536 A1 | 9/2011 | Shams et al. |
| 2011/0227812 A1 | 9/2011 | Haddick et al. |
| 2011/0227813 A1 | 9/2011 | Haddick et al. |
| 2011/0227820 A1 | 9/2011 | Haddick et al. |
| 2011/0228403 A1 | 9/2011 | Masuda et al. |
| 2011/0231757 A1 | 9/2011 | Haddick et al. |
| 2011/0250962 A1 | 10/2011 | Feiner et al. |
| 2011/0283865 A1 | 11/2011 | Collins |
| 2011/0289810 A1 | 12/2011 | D'Souza et al. |
| 2012/0050144 A1 | 3/2012 | Morlock |
| 2012/0068913 A1 | 3/2012 | Bar-Zeev et al. |
| 2012/0120498 A1 | 5/2012 | Harrison et al. |
| 2012/0120499 A1 | 5/2012 | Harrison et al. |
| 2012/0123742 A1 | 5/2012 | Harrison et al. |
| 2012/0154920 A1 | 6/2012 | Harrison et al. |
| 2012/0204307 A1* | 8/2012 | De Mattei ............ A41D 1/002 2/69 |
| 2012/0212400 A1 | 8/2012 | Border et al. |
| 2012/0242695 A1* | 9/2012 | Martin .................. G09C 5/00 345/633 |
| 2012/0274775 A1* | 11/2012 | Reiffel ................. G06Q 30/08 348/158 |
| 2012/0326948 A1 | 12/2012 | Crocco et al. |
| 2013/0016123 A1* | 1/2013 | Skarulis ................ G09G 5/00 345/633 |
| 2013/0021224 A1 | 1/2013 | Fujikawa et al. |
| 2013/0163090 A1 | 6/2013 | Yu |
| 2014/0002677 A1* | 1/2014 | Schinker .............. H04N 5/232 348/207.1 |
| 2014/0104274 A1 | 4/2014 | Hilliges et al. |
| 2014/0152531 A1 | 6/2014 | Murray et al. |
| 2014/0182659 A1 | 7/2014 | Davis et al. |
| 2015/0103152 A1 | 4/2015 | Qin |
| 2015/0177516 A1 | 6/2015 | Blonde et al. |
| 2015/0178992 A1* | 6/2015 | Bhuruth ............... G06T 19/006 345/633 |
| 2015/0260474 A1* | 9/2015 | Rublowsky ........... F41A 33/00 434/16 |
| 2016/0187969 A1* | 6/2016 | Larsen .................. G06F 3/012 345/156 |

FOREIGN PATENT DOCUMENTS

| | | |
|---|---|---|
| DE | 102007009828 A1 | 9/2008 |
| EP | 1418458 A1 | 12/2004 |
| EP | 2624238 A1 | 7/2013 |
| GB | 2461907 A | 1/2010 |
| JP | 55-164801 A | 12/1980 |
| JP | 02-032301 A | 2/1990 |
| JP | 05-303054 A | 11/1993 |
| JP | H07134266 A | 5/1995 |
| JP | H07225790 A | 8/1995 |
| JP | H07244246 A | 9/1995 |
| JP | H08190072 A | 7/1996 |
| JP | 08-278476 A | 10/1996 |
| JP | 10-080575 A | 3/1998 |
| JP | 10-206786 A | 8/1998 |
| JP | 2000047138 A | 2/2000 |
| JP | 2002287077 A | 10/2002 |
| JP | 2006039359 A | 2/2006 |
| JP | 2006091477 A | 4/2006 |
| JP | 2008058461 A | 3/2008 |
| JP | 2008529064 A | 7/2008 |
| JP | 2009069364 A | 4/2009 |
| JP | 2009232133 A | 10/2009 |
| JP | 2010019874 A | 1/2010 |
| JP | 2010020065 A | 1/2010 |
| JP | 2010517090 A | 5/2010 |
| JP | 2011133633 A | 7/2011 |
| KR | 10-0292015 B1 | 3/2001 |
| TW | I244318 B | 11/2005 |
| WO | 9722964 A1 | 6/1997 |
| WO | 2005017729 A2 | 2/2005 |
| WO | 2008051578 A2 | 5/2008 |
| WO | 2009066408 A1 | 5/2009 |
| WO | 2009094643 A2 | 7/2009 |
| WO | 2010047212 A1 | 4/2010 |
| WO | 2010123934 A1 | 10/2010 |
| WO | 2011114149 A1 | 9/2011 |
| WO | 2012052980 A2 | 4/2012 |
| WO | 2012052981 A2 | 4/2012 |
| WO | 2012083042 A1 | 6/2012 |

OTHER PUBLICATIONS

Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.

Upton et al., "Eyeglass Head-Up Display Vibrating Fiber Optic Assembly," 1981 SID International Symposium, Digest of Papers, Apr. 28-30, 1981, vol. XII, pp. 48-49, New York, NY, SID, Los Angeles, CA.

Vanden Brook, T., "Device Helps Pinpoint Snipers: Technology Is Critical for U.S. Combat Troops," USA Today, Wednesday, Mar. 2, 2011.

von Waldkirch et al., "Spectacle-Based Design of Wearable See-Through Display for Accommodation-Free Viewing," Proceedings of the Second International Conference on Pervasive Computing, (Lecture Notes in Comput. Sci. vol. 3001 ), Apr. 18-23, 2004, pp. 106-123, Springer-Verlag, Berlin, Germany.

(56) References Cited

OTHER PUBLICATIONS

Wang, Robert Y. et al., "Real-time hand-tracking with a color glove," retrieved Dec. 16, 2014 from http://people.csail.mit.edu/rywang/hand/, 3 pages.
Yang et al., "Hybrid Diffractive-Refractive 67 degree-Diagonal Field of View Optical See-Through Head-Mounted Display," Institute of Modem Optics, Aug. 17, 2005, pp. 351-355, vol. 116, No. 7, Optik—Internal, Nankai University, Tianjin, China.
Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.
International Search Report for PCT/IB2011/055824 dated May 16, 2012, 4 pages.
Written Opinion of the International Searching Authority for PCT/IB2011/055824 dated May 2, 2013, 5 pages.
International Preliminary Report on Patentability for PCT/IB2011/055824 dated May 2, 2013, 7 pages.
Examination Report for Australian Patent Application No. 2011319480 dated Oct. 27, 2014, 3 pages.
Examination Report for Australian Patent Application No. 2011319481 dated Oct. 23, 2014, 3 pages.
Examination Report for Australian Patent Application No. 2011343660 dated Oct. 31, 2014, 3 pages.
International Search Report for PCT/IB2011/055820 dated May 21, 2012, 4 pages.
International Search Report and Written Opinion for PCT/US2011/065201 dated Mar. 7, 2012, 14 pages.
International Preliminary Report on Patentability for PCT/US2011/065201 dated Jun. 27, 2013, 11 pages.
International Search Report for PCT/IB2011/055826 dated Sep. 14, 2012, 4 pages.
International Preliminary Report on Patentability for PCT/IB2011/055826 dated May 2, 2013, 11 pages.
First Office Action for Chinese Patent Application No. 201180060659.0, dated Nov. 3, 2014, 10 pages.
First Office Action for Chinese Patent Application No. 201180060662.2, dated Nov. 2, 2014, 13 pages.
Non-final Office Action for U.S. Appl. No. 13/211,365 dated Oct. 24, 2012, 12 pages.
Final Office Action for U.S. Appl. No. 13/211,365 dated Feb. 22, 2013, 15 pages.
Non-final Office Action and Examiner-Initiated Interview Summary for U.S. Appl. No. 13/211,365 dated Jun. 14, 2013, 18 pages.
Final Office Action for U.S. Appl. No. 13/211,365 dated Oct. 18, 2013, 22 pages.
Non-final Office Action for U.S. Appl. No. 13/211,365 dated Apr. 22, 2014, 9 pages.
Notice of Allowance for U.S. Appl. No. 13/211,365, dated Aug. 8, 2014, 7 pages.
Non-Final Office Action for U.S. Appl. No. 13/211,365, dated Jan. 12, 2015, 20 pages.
Non-final Office Action for U.S. Appl. No. 13/211,372 dated Nov. 21, 2012, 9 pages.
Non-final Office Action for U.S. Appl. No. 13/211,372 dated Mar. 7, 2013, 12 pages.
Final Office Action for U.S. Appl. No. 13/211,372 dated Aug. 1, 2013, 7 pages.
Notice of Allowance for U.S. Appl. No. 13/211,372 dated Sep. 6, 2013, 8 pages.
Non-final Office Action for U.S. Appl. No. 13/211,389 dated Feb. 26, 2013, 21 pages.
Final Office Action for U.S. Appl. No. 13/211,389 dated Jul. 12, 2013, 25 pages.
Notice of Allowance and Applicant-Initiated Interview Summary for U.S. Appl. No. 13/211,389 dated Sep. 19, 2013, 10 pages.
Notice of Allowance for U.S. Appl. No. 13/211,389 dated Jan. 6, 2014, 8 pages.
Non-final Office Action for U.S. Appl. No. 13/327,217 dated Jan. 17, 2014, 14 pages.
Final Office Action for U.S. Appl. No. 13/327,217 dated Jul. 31, 2014, 13 pages.
Advisory Action for U.S. Appl. No. 13/327,217 dated Nov. 5, 2014, 3 pages.
Office Action for Mexican Patent Application No. MX/a/2013/006722, dated Dec. 8, 2014, 7 pages.
Examination Report for European Patent Application No. 11815630.6, dated Nov. 20, 2015, 4 pages.
Notification of Reason(s) for Rejection for Japanese Patent Application No. 2013-534453, dated Dec. 22, 2015, 9 pages.
Patent Examination Report No. 2 for Australian Patent Application No. 2011343660, dated Oct. 22, 2015, 3 pages.
Notice of Acceptance for Australian Patent Application No. 2011319481, dated Oct. 12, 2015, 3 pages.
Second Office Action for Chinese Patent Application No. 201180060659.0, dated Jun. 30, 2015, 6 pages.
Third Office Action for Chinese Patent Application No. 201180060659.0, dated Dec. 15, 2015, 6 pages.
Notification of Reason(s) for Rejection for Japanese Patent Application No. JP 2013-534454, dated Sep. 17, 2015, 7 pages.
Office Action and Search Report for Taiwanese Patent Application No. 100148694, dated Dec. 1, 2015, 18 pages.
Second Office Action for Chinese Patent Application No. 201180060662.2, dated Jun. 10, 2015, 7 pages.
Office Action and Search Report for Taiwanese Patent Application No. 100148681, dated Oct. 5, 2015, 15 pages.
Decision of Final Rejection for Japanese Patent Application No. 2013-534454, dated Mar. 31, 2017, 11 pages.
Decision of Final Rejection for Japanese Patent Application No. 2013-544784, dated Mar. 31, 2017, 9 pages.
Notice of Allowance for U.S. Appl. No. 13/211,365, dated Mar. 28, 2017, 4 pages.
Advisory Action for U.S. Appl. No. 14/884,975, dated Apr. 21, 2017, 3 pages.
Non-Final Office Action for U.S. Appl. No. 15/058,739, dated May 23, 2017, 9 pages.
International Preliminary Report on Patentability for International Patent Application No. PCT/US2015/055918, dated Apr. 27, 2017, 6 pages.
Notice of Allowance and Examiner-Initiated Interview Summary for U.S. Appl. No. 13/327,217, dated Mar. 24, 2017, 12 pages.
First Office Action for Chinese Patent Application No. 201180067287.4, dated Feb. 4, 2015, 11 pages.
Second Office Action for Chinese Patent Application No. 201180067287.4, dated Oct. 10, 2015, 9 pages.
Examination Report for European Patent Application No. 11806088.8, dated Oct. 27, 2015, 3 pages.
Notification of Reason(s) for Rejection for Japanese Patent Application No. JP 2013-544784, dated Aug. 17, 2015, 9 pages.
Final Office Action for U.S. Appl. No. 13/211,365, dated Jun. 15, 2015, 23 pages.
Notice of Allowance for U.S. Appl. No. 13/211,365, dated Sep. 21, 2015, 7 pages.
Non-Final Office Action for U.S. Appl. No. 13/327,217, dated May 21, 2015, 12 pages.
Final Office Action for U.S. Appl. No. 13/327,217, dated Oct. 8, 2015, 15 pages.
Advisory Action for U.S. Appl. No. 13/327,217, dated Jan. 4, 2016, 9 pages.
Non-final Office Action for U.S. Appl. No. 13/211,365, dated Feb. 2, 2016, 15 pages.
Unknown, "Optical head-mounted display," Wikipedia, last modified Feb. 25, 2016, en.wikipedia.org/wiki/Optical_head-mounted_display, 18 pages.
Hua, Hong, "Past and future of wearable augmented reality displays and their applications," SPIE Proceedings, vol. 9186, Oct. 20, 2014, SPIE, pp. 91860O-1 to 91860O-12.
Olwal, Alex, et al., "ASTOR: An Autostereoscopic Optical See-through Augmented Reality System," Proceedings of the Fourth IEEE and ACM International Symposium on Mixed and Augmented Reality, Oct. 5-8, 2005, Vienna, Austria, IEEE, pp. 24-27.

(56) References Cited

OTHER PUBLICATIONS

Rolland, Jannick, P., "Wide-angle, off-axis, see-through head-mounted display," Optical Engineering, vol. 39, Issue 7, Jul. 1, 2000, Society of Photo-Optical Instrumentation Engineers, pp. 1760-1767.
Examination Report for European Patent Application No. 11815631.4, dated Apr. 13, 2016, 11 pages.
Notice of Allowance and Search Report for Taiwanese Patent Application No. 100148681, dated Mar. 14, 2016, 12 pages.
Third Office Action for Chinese Patent Application No. 201180067287.4, dated Apr. 12, 2016, 10 pages.
Final Office Action for U.S. Appl. No. 13/211,365, dated Jul. 11, 2016, 13 pages.
International Search Report and Written Opinion for PCT/US2015/055918, dated Jan. 27, 2016, 9 pages.
Non-Final Office Action for U.S. Appl. No. 13/327,217, dated Jun. 2, 2016, 18 pages.
Debevec, Paul, et al., "A Lighting Reproduction Approach to Live-Action Compositing," Proceedings of the 29th annual conference on Computer graphics and interactive techniques (SIGGRAPH), Jul. 21-26, 2002, San Antonio, Texas, ACM, pp. 1-10.
Waese, Jamie, "SIGGRAPH paper: Infrared Chroma Key," waese.com/infrared-chroma-key/, 2015, Jamie Waese, pp. 1-3.
Decision of Final Rejection for Japanese Patent Application No. 2013-534453, dated Jul. 26, 2016, 5 pages.
Patent Examination Report No. 1 for Australian Patent Application No. 2015249168, dated Jun. 27, 2016, 3 pages.
Notification of Reasons for Rejection for Japanese Patent Application No. 2013-534454, dated Jun. 1, 2016, 13 pages.
Notification of Reasons for Rejection for Japanese Patent Application No. 2013-544784, dated May 31, 2016, 11 pages.
Non-Final Office Action for U.S. Appl. No. 14/884,975, dated Sep. 9, 2016, 30 pages.
Non-Final Office Action for U.S. Appl. No. 14/501,509, dated Jul. 15, 2016, 7 pages.
International Search Report and Written Opinion for International Patent Application No. PCT/US2016/020444, dated Jun. 14, 2016, 11 pages.
Non-Final Office Action for U.S. Appl. No. 13/303,607, dated Mar. 20, 2014, 23 pages.
Final Office Action for U.S. Appl. No. 13/303,607, dated Oct. 9, 2014, 27 pages.
Non-Final Office Action for U.S. Appl. No. 13/304,780 dated Jan. 30, 2013, 13 pages.
Final Office Action for U.S. Appl. No. 13/304,780, dated Aug. 15, 2013, 16 pages.
Notice of Allowance and Applicant-Initiated Interview Summary for U.S. Appl. No. 13/304,780, dated Nov. 8, 2013, 15 pages.
Second Office Action for Mexican Patent Application No. MX/a/2013/004453, dated Jan. 19, 2017, 6 pages.
International Preliminary Report on Patentability for International Patent Application No. PCT/IB2011/055820, dated May 2, 2013, 8 pages.
Examination Report for European Patent Application No. 11806088.8, dated Dec. 7, 2016, 5 pages.
Final Office Action for U.S. Appl. No. 14/884,975, dated Feb. 8, 2017, 36 pages.
International Search Report for International Patent Application No. PCT/US2016/057731, dated Dec. 19, 2016, 12 pages.
Office Action for Mexican Patent Application No. MX/a/2013/004453, dated Oct. 12, 2016, 3 pages.
Notice of Acceptance for Australian Patent Application No. 2015249168, dated Nov. 4, 2016, 2 pages.
Office Action for Mexican Patent Application No. MX/a/2013/004454, dated Oct. 12, 2016, 3 pages.
Decision of Rejection for Chinese Patent Application No. 201180067287.4, dated Oct. 17, 2016, 14 pages.
Advisory Action for U.S. Appl. No. 13/211,365, dated Nov. 7, 2016, 3 pages.
Applicant-Initiated Interview Summary for U.S. Appl. No. 13/211,365, dated Nov. 17, 2016, 4 pages.
Notice of Allowance and Applicant-Initiated Interview Summary for U.S. Appl. No. 13/211,365, dated Nov. 23, 2016, 9 pages.
Final Office Action for U.S. Appl. No. 13/327,217, dated Nov. 30, 2016, 24 pages.
Amery, John G., et al., "Flight Simulation Visual Requirements and a New Display System," Cockpit Displays VI: Displays for Defense Applications, Proceedings of the SPIE, vol. 3690, Aug. 16, 1999, 16 pages.
Author Unknown, "ABI Research Anticipates 'Dramatic Growth' for Augmented Reality via Smartphones," Human-Machine Technology Research Service, ABI Research, Oct. 22, 2009, 1 page.
Author Unknown, "VST-2200FL Flight Simulator," Virtual SimTech, 2013, http://www.virtualsimtech.com/flightsimulators.htm, 2 pages.
Author Unknown, "Head Mounted Displays from INITION," Retrieved from http://www.inition.co.uk/3D-Technologies/productsection/31, Accessed on Dec. 30, 2011, 4 pages.
Author Unknown, "Immersive Displays: Powerwall, CAVE, Headmounted Displays (HMD)," InterSense Applications, Downloaded at http://www.intersense.com/categories/11/, Accessed on Mar. 7, 2011, InterSense Incorporated, 3 pages.
Author Unknown, "Lumus—Consumer Market Products," Retrieved from http://www.lumus-optical.com/index.php?option=com_content&task=view&id=9&1temid=15, Accessed on Dec. 30, 2011, Lumus Ltd., 4 pages.
Author Unknown, "SEOS Ultra Wide Field-of-View Head Mounted Display," SEOS HMD 120/40, Product Specifications, Retrieved from http://cgsd.com/SEOSHMD/, Accessed on Oct. 31, 2013, SEOS Displays Ltd., 3 pages.
Author Unknown, "Vuzix High Resolution Video Eyewear: The Future of Big Screen Viewing on the Go!," Vuzix Products, Retrieved from http://www.vuzix.com/consumer, Retrieved Dec. 30, 2011, Vuzix, 2 pages.
Ayras et al., "Near-To-Eye Display Based on Retinal Scanning and a Diffractive Exitpupil Expander," Proceedings of SPIE—The International Society for Optical Engineering, Apr. 12-15, 2010, vol. 7723, No. 77230V, SPIE, 8 pages.
Azuma et al., "Improving Static and Dynamic Registration in an Optical See-through HMD," Computer Graphics: Proceedings of SIGGRAPH 1994, Annual Conference Series, Orlando, Florida, Jul. 24-29, 1994, pp. 197-204.
Bayer et al., "Chapter 3: Introduction to Helmet-Mounted Displays," Excerpt from Helmet-Mounted Displays: Sensation, Perception and Cognition Issues, U.S. Army Medical Department, Medical Research and Material Command, USAARL, 2009, 65 pages.
Billinghurst et al., "Collaboration with Tangible Augmented Reality Interfaces," Proceedings of the Ninth International Conference on Human-Computer Interaction, Aug. 2001, vol. 1, 5 pages.
Cakmakci et al., "Meshfree Approximation Methods for Free-Form Surface Representation in Optical Design With Applications to Head-Worn Displays," Proceedings of the SPIE, Aug. 2008, vol. 7061, SPIE, 15 pages.
Cakmakci et al., "Optical Free-Form Surfaces in Off-Axis Head-Worn Display Design," Mixed and Augmented Reality, 7th IEEE/ACM International Symposium, Mar. 2008, pp. 29-32.
Dejong, C. Dean, "Full-Color, See-Through, Daylight-Readable, Goggle-Mounted Display," Proceedings of SPIE-The International Society for Optical Engineering, Apr. 28, 2011, vol. 8041, SPIE, 13 pages.
Feiner, Steven, et al., "MARS—Mobile Augmented Reality Systems," Columbia University, Computer Graphics and User Interfaces Lab, Downloaded at http://graphics.cs.columbia.edu/projects/mars/, Accessed on Mar. 7, 2011, 4 pages.
Ferscha et al., "Wearable Displays—for Everyone!", Pervasive Computing, Jan.-Mar. 2010, vol. 9, No. 1, Institute of Electrical and Electronics Engineers Inc., pp. 7-10.
Haun, Bzur, "Gartner: Mobility market will reach $1 trillion by 2014," Mobility Management News and Blogs, Visage Mobile, Oct. 21, 2010, 2 pages.

(56) References Cited

OTHER PUBLICATIONS

Hastings, A., "Eye Box Performance Parameters for Non Pupil Forming. Head/Helmet Mounted Displays," Tutorial, OPT 521, Dec. 6, 2006, www.optics.arizona.edu/optomech/.../tutorials/HastingsTutorial1.doc, 6 pages.

Henderson, Steve, et al., "Augmented Reality for Maintenance and Repair (ARMAR)," Columbia University, Computer Graphics and User Interfaces Lab, Downloaded at http://graphics.cs.columbia.edu/projects/armar/, Jul. 2007, 4 pages.

Holden, Windsor, "A New Reality for Mobile," Whitepaper, Juniper Research Limited, Feb. 2011, 5 pages.

Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510l/references/mil-hdbk-141 /ch7_12.pdf, 20 pages.

Jeon et al., "Mosaicing a Wide Geometric Field of View for Effective Interaction in Augmented Reality," Mixed and Augmented Reality, 6th IEEE and ACM International Symposium, Mar. 2007, pp. 265-266.

Kato et al., "Marker Tracking and HMD Calibration for a Video-based Augmented Reality Conferencing System," Proceedings of the 2nd IEEE and ACM International Workshop on Augmented Reality, Oct. 1999, San Francisco, California, 10 pages.

Kato et al., "Virtual Object Manipulation on a Table-Top AR Environment," 2000, 9 pages.

Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.

Klepper, Sebastian, "Augmented Reality—Display Systems," Technische Universitaet Muenchen, Munich, Germany, Jul. 4, 2007, http://campar.in.tum.de/twiki/pub/Chair/TeachingSs07 ArProseminar/1_Display-Systems_Klepper_Report.pdf.

Kurze et al., "Smart Glasses: An Open Environment for AR Apps," 2010 9th IEEE International Symposium on Mixed and Augmented Reality (ISMAR), Science & Technology Papers, Oct. 13-16, 2010, Seoul, South Korea, p. 313.

Lingley et al., "A Single-Pixel Wireless Contact Lens Display," J. Micromech. Microeng., 21 (2011) 125014 (8pp); doi:1 0.1 088/0960-1317/21/12/125014; Nov. 22, 2011, Received Jun. 9, 2011, in final form Sep. 19, 2011.

Liu et al., "An Optical See-Through Head Mounted Display with Addressable Focal Planes," IEEE Int'l Symposium on Mixed and Augmented Reality, Sep. 15-18, 2008, Cambridge, UK.

Livingston et al., "An Augmented Reality System for Military Operations in Urban Terrain," Proc of I/ITSEC '02, Orlando, FL, Dec. 2-5, 2002.

McClernon, Chris et al., "PC-Based Desktop Display versus Immersive Head-Mounted Display Flight Simulator Performance," Interservice/Industry Training, Simulation, and Education Conference (I/ITSEC), Dec. 2006, http://www.iitsecdocs.com, 7 pages.

Melzer et al., "Guidelines for HMD Design," in Helmet-Mounted Displays: Sensation, Perception and Cognition Issues, C. E. Rash et al., ed., U.S. Army Aeromedical Research Laboratory, Fort Rucker, AL, 2009, Chapter 17, http://www.usaarl.army.mil/publications/hmd_book09/files/Section%2026%20-%20Chapter17 %20Guidelines%20for%20HMD%20design.pdf.

Melzer, James E., "Head-Mounted Displays," The Avionics Handbook, Cary R. Spitzer, ed., CRC Press, Boca Raton Florida, 2001, Chapter 5, http://www.davi.ws/avionics/TheAvionicsHandbook_Cap_5.pdf.

Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.

Mukawa et al., "A Full Color Eyewear Display Using Holographic Planar Waveguides," IDW'08—Proceedings of the 15th International Display Workshops, Dec. 3-5, 2008, vol. 1, pp. 259-262, Inst. of Image Information and Television Engineers.

Mukawa et al., "A Full-Color Eyewear Display Using Planar Waveguides with Reflection Volume Holograms," Journal of the Society for Information Display, vol. 17, No. 3, pp. 185-193, Mar. 2009, Society for Information Display.

Nagahara et al., "Super Wide Viewer Using Catadioptric Optics," Proc. ACM Symposium on Virtual Reality Software and Technology (VRST2003), Oct. 2003, pp. 169-175, Osaka, Japan.

Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, pp. 3738-3743.

Nagahara et al., "Wide Field of View Head Mounted Display for Tele-Presence with an Omnidirectional Image Sensor," Computer Vision and Pattern Recognition Workshop, Jun. 16-22, 2003, vol. 7, 6 pages.

Okuma et al., "An Augmented Reality System Using a Real-Time Vision Based Registration," Proceedings of the Fourteenth International Conference on Pattern Recognition, Aug. 16-20, 1998, p. 1226, vol. 2.

Parviz, Babak A., "Augmented Reality in a Contact Lens," IEEE Spectrum, Sep. 2009, http://spectrum.ieee.org/biomedical/bionics/augmented-reality-in-a-contact-lens/0.

Perey, Christine, et al., "Where's the Money? Mobile AR Revenue Streams," Mobile AR Summit Position Paper, Downloaded at http://www.perey.com/MobileARSummit/PEREY-Mobile%20AR-Revenue-Streams.pdf, Feb. 9, 2010, 4 pages.

Pratt, P. D., "Advanced Helmet Sight Reticle Assembly (AHRA)," Jul. 1976, p. 364, Honeywell Inc., Minneapolis Minn. Systems and Research Div.

Rolland et al., "Development of Head-Mounted Projection Displays for Distributed, Collaborative, Augmented Reality Applications," Oct. 2005, Presence, vol. 14, No. 5, pp. 528-549.

Rolland et al., "Invited Paper Head-Worn Displays—Lens Design," 48th Annual SID Symposium, Seminar, and Exhibition 2010, Display Week 2010, May 23-28, 2010, vol. 2, pp. 855-858, Society for Information Display.

Rose, Melinda, "Microdisplays: Coming Soon to an Eye Near You?", Photonics Spectra, Sep. 2008, vol. 42, No. 9, pp. 68-69, Laurin Publishing Co. Inc.

Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE-Int. Soc. Opt. Eng.

Schwald et al., "An Augmented Reality System for Training and Assistance to Maintenance in the Industrial Context," Journal of WSCG, Feb. 3-7, 2003, vol. 11, No. 1, Plzen, Czech Republic.

Spitzer et al., "Video I/0 Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE-Int. Soc. Opt. Eng, USA.

Non-Final Office Action for U.S. Appl. No. 14/959,444, dated Jul. 3, 2017, 9 pages.

Non-Final Office Action for U.S. Appl. No. 14/884,975, dated Jul. 12, 2017, 45 pages.

Non-Final Office Action for U.S. Appl. No. 14/858,733, dated Jun. 26, 2017, 11 pages.

Final Office Action for U.S. Appl. No. 15/058,739, dated Sep. 13, 2017, 16 pages.

Notification of Reason for Rejection for Japanese Patent Application No. 2016-229136, dated Oct. 30, 2017, 5 pages.

Office Action for Canadian Patent Application No. 2,815,461, dated Oct. 26, 2017, 4 pages.

Office Action for Canadian Patent Application No. 2,821,401, dated Oct. 17, 2017, 4 pages.

Office Action for Korean Patent Application No. 10-2013-701735, dated Oct. 30, 2017, 10 pages.

Office Action for Canadian Patent Application No. 2,815,452, dated Oct. 31, 2017, 4 pages.

Office Action for Korean Patent Application No. 10-2013-7013039, dated Dec. 18, 2017, 9 pages.

(56) References Cited

OTHER PUBLICATIONS

Examination Report for European Patent Application No. 11815630.6, dated Dec. 13, 2017, 6 pages.
Final Office Action for U.S. Appl. No. 14/884,975, dated Dec. 11, 2017, 45 pages.
Notice of Allowance for U.S. Appl. No. 15/058,739, dated Nov. 30, 2017, 8 pages.
Corrected Notice of Allowance for U.S. Appl. No. 15/058,739, dated Dec. 7, 2017, 5 pages.
Final Office Action for U.S. Appl. No. 14/858,733, dated Dec. 22, 2017, 17 pages.
Decision to Grant a Patent for Japanese Patent Application No. 2013-534454, dated Oct. 18, 2017, 6 pages.
Notification of Reexamination for Chinese Patent Application No. 201180067287.4, dated Sep. 5, 2017, 10 pages.
Decision to Grant a Patent for Japanese Patent Application No. 2013-544784, dated Oct. 18, 2017, 6 pages.
International Preliminary Report on Patentability for International Patent Application No. PCT/US2016/020444, dated Sep. 14, 2017, 8 pages.
Decision of Reexamination for Chinese Patent Application No. 201180067287.4, dated Feb. 11, 2018, 23 pages.
First Office Action for Korean Patent Application No. 10-2013-7013038, dated Mar. 5, 2018, 9 pages.
Final Office Action for U.S. Appl. No. 14/959,444, dated Jan. 16, 2018, 11 pages.
Advisory Action for U.S. Appl. No. 14/884,975, dated Feb. 23, 2018, 3 pages.
Non-Final Office Action for U.S. Appl. No. 14/887,800, dated Apr. 4, 2018, 18 pages.
Non-Final Office Action for U.S. Appl. No. 14/858,733, dated Apr. 5, 2018, 23 pages.
Grant of Patent for Korean Patent Application No. 10-2013-7017315, dated Apr. 26, 2018, 5 pages.
Advisory Action for U.S. Appl. No. 14/959,444, dated Apr. 18, 2018, 5 pages.

\* cited by examiner

AUGMENTED REALITY SYSTEMS HAVING A VIRTUAL IMAGE OVERLAYING AN INFRARED PORTION OF A LIVE SCENE

TECHNICAL FIELD

The embodiments relate generally to an augmented reality system and, in particular, to an augmented reality system having a virtual image overlaying an infrared portion of a live scene.

BACKGROUND

Commercial simulators, such as flight simulators, are relatively large systems that require a substantial amount of space. A flight simulator, for example, may include a large dome on which imagery is projected. The flight simulator may also include multiple projectors and image generators, which are costly, require a substantial amount of power, and generate a substantial amount of heat, which in turn increases environmental cooling requirements.

On the other hand, simulators that utilize virtual reality (VR) headgear suffer a number of problems that detract from realism. For example, movements of the participant or other objects that would naturally be seen by the participant in a non-VR simulation, such as movement of a cockpit control by the participant's hand, are often not depicted in the imagery even though during such movement the user's hand would come within the field-of-view of the participant if the participant were not wearing the VR headgear. Accordingly, there is a need for a simulator system that also allows a user to simultaneously view real-world foreground objects against virtual background images as a composite scene, such as an augmented reality system.

Chroma key compositing is one method for creating a composite image or scene, but it is not well suited for use in a simulation environment using an augmented reality system that overlays real-world imagery in a live scene with virtual imagery. With conventional chroma key compositing, a foreground image containing one or more objects has a background portion of a predetermined color (typically a saturated shade of blue or green). A processing device removes the monochrome portion from the foreground image and replaces the monochrome portion with a corresponding portion of a second, background image. The objects in the foreground that do not contain the predetermined color are retained, making the foreground objects appear to be in front of the background image, thereby forming a composite image of the foreground objects against a different background. However, in an augmented reality system using a see-through lens, the part of the augmented scene is a real-world environment, such as a vehicle interior, being viewed through a lens of the augmented reality system. For chroma key to function, a portion of the real-world environment, such as a window region of the vehicle interior, must be covered with a bright monochrome surface. When the augmented reality system provides a virtual image corresponding to the monochrome portion of the scene to the user via the lens, however, the monochrome portion of the live scene will still be visible to the user through the lens, because the bright background tends to bleed through the virtual image displayed on the lens, thereby causing the virtual image to appear washed out, faded, and artificial.

SUMMARY

In one embodiment, a head-mounted display (HMD) for an augmented reality system allows a user to view an augmented scene comprising a real-world portion of a live scene combined with virtual images overlaying an infrared (IR) portion of the live scene. The HMD includes a head-wearable frame, a lens defining a user field of view (FOV), and a camera having a camera FOV registered to the user FOV. The lens permits the user to view a live scene corresponding to the user FOV, and the camera is configured to capture an image of the live scene containing data indicative of an IR portion of the live scene. The IR portion of the live scene includes reflected IR light above a predetermined threshold, such as from an IR reflective background surface in a simulation environment. For example, without being limiting, the live scene may be of a vehicle interior, with the IR portion corresponding to a window of the vehicle covered with an IR reflective material. The IR portion is captured by the camera despite being invisible to the user, and a virtual image registered to the IR portion is displayed on an interior surface of the lens so that the virtual image overlays the IR portion. For example, the virtual image could be an out the window (OTW) view of a landscape or other environment, which overlays the window of the vehicle in the live scene to simulate an actual OTW view from the vehicle interior. Unlike conventional chroma key techniques, which requires a bright background with saturated color in the visible spectrum to function, the IR reflective surface can be made significantly darker and less saturated in the visible spectrum without hindering the IR reflectivity of the IR reflective surface. This allows the virtual image to be viewed on an internal surface of a lens while simultaneously viewing a live scene through the lens. Because the IR portion is not required to be bright or saturated in the visible spectrum, the virtual image can be displayed on the interior surface of the lens without the IR portion of the live scene "bleeding through" or otherwise distorting the virtual image.

In one embodiment, a HMD is disclosed. The HMD comprises a head-wearable frame configured to be worn by a user. The HMD further comprises a lens coupled to the frame. The lens defines a user FOV. The lens comprises an interior surface configured to face the user. The HMD further comprises a camera coupled to the frame. The camera has a camera FOV registered to the user FOV. The camera is configured to capture a captured image of a live scene corresponding to the user FOV. The captured image comprises data indicative of an IR portion of the live scene. The IR portion comprises IR light in a predetermined IR wavelength band reflected above a predetermined threshold. The HMD further comprises a display device configured to display a virtual image on the interior surface of the lens. The virtual image is registered to the IR portion of the live scene based on the captured image. The virtual image overlays the IR portion of the live scene in the user FOV.

In another embodiment, an augmented reality system is disclosed. The system comprises an HMD comprising a head-wearable frame configured to be worn by a user. The HMD further comprises a lens coupled to the frame, the lens defining a user FOV. The lens comprises an interior surface configured to face the user. The HMD further comprises a camera coupled to the frame, the camera having a camera FOV registered to the user FOV. The camera is configured to capture a captured image of a live scene corresponding to the user FOV. The HMD further comprises a display device configured to display a virtual image on the interior surface of the lens. The system further comprises a simulation environment comprising an infrared (IR) reflective surface disposed in the live scene. The IR reflective surface is configured to reflect IR light to define an IR portion of the live scene. The virtual image is registered to the IR portion of the live scene on the interior surface of the lens. The virtual image overlays the IR portion of the live scene in the user FOV.

In another embodiment, a method of providing a virtual image to a HMD is disclosed. The method comprises determining an IR portion of a live scene based on a captured image of the live scene, the live scene corresponding to a user FOV defined by a lens of the head-mounted display. The IR portion comprises IR light in a predetermined IR wavelength band reflected above a predetermined threshold. The method further comprises displaying, via a display device of the head-mounted display, a virtual image on an interior surface of the lens. The virtual image is registered to the IR portion of the live scene based on the captured image. The virtual image overlays the IR portion of the live scene in the user FOV.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
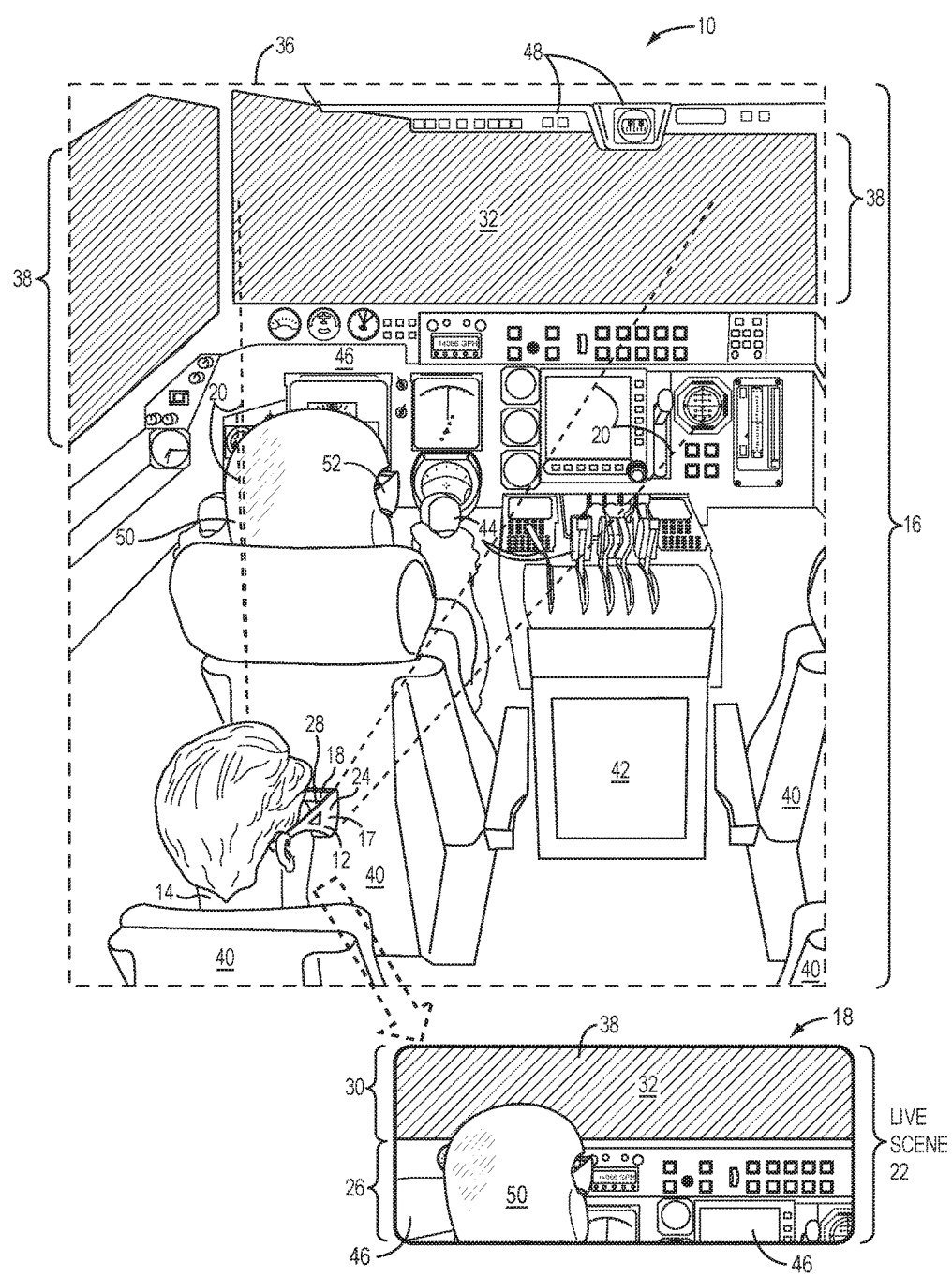
FIG. 1 is a diagram of an environment during a simulation according to one embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first user" and "second user," and does not imply a priority, a type, an importance, or other attribute, unless otherwise stated herein.

As used herein and in the claims, the articles "a" and "an" in reference to an element refers to "one or more" of the element unless otherwise explicitly specified.

As used herein, phrases using the term "infrared" or "IR" (e.g., "infrared light," "infrared radiation," "infrared illumination") correspond to electromagnetic radiation (EMR) wavelengths between 700 nm and 1 mm. Sub-bands within the IR spectrum may include, without limitation, short-wavelength IR (SWIR) corresponding to wavelengths between 1.4 µm and 3 µm, mid-wavelength IR (MWIR), corresponding to wavelengths between 3 µm and 8 µm, and long-wave IR (LWIR) corresponding to wavelengths between 8 µm and 15 µm. Similarly, phrases using the term "visible" (e.g., "visible light," "visible radiation," "visible illumination") correspond to electromagnetic wavelengths between 400 nm and 700 nm.

In one embodiment, a head-mounted display (HMD) for an augmented reality system allows a user to view an augmented scene comprising a real-world portion of a live scene combined with virtual images configured to overlay an infrared (IR) portion of the live scene. The HMD includes a head-wearable frame, a lens defining a user field of view (FOV), and a camera having a camera FOV registered to the user FOV. The lens permits the user to view a live scene corresponding to the user FOV, and the camera is configured to capture an image of the live scene containing data indicative of an IR portion of the live scene. The IR portion of the live scene includes reflected IR light above a predetermined threshold, such as from an IR reflective background surface in a simulation environment. For example, without being limiting, the live scene may be of a vehicle interior, with the IR portion corresponding to a window of the vehicle covered with an IR reflective material. The IR portion is captured by the camera despite being invisible to the user, and a virtual image registered to the IR portion is displayed on an interior surface of the lens so that the virtual image overlays the IR portion. For example, the virtual image could be an out the window (OTW) view of a landscape or other environment, which overlays the window of the vehicle in the live scene to simulate an actual OTW view from the vehicle interior. Unlike conventional chroma key techniques, which requires a bright background with saturated color in the visible spectrum to function, the IR reflective surface can be made significantly darker and less saturated in the visible spectrum without hindering the IR reflectivity of the IR reflective surface. This allows the virtual image to be viewed on an internal surface of a lens while simultaneously viewing a live scene through the lens. Because the IR portion is not required to be bright or saturated in the visible spectrum, the virtual image can be displayed on the interior surface of the lens without the IR portion of the live scene "bleeding through" or otherwise distorting the virtual image.

In this regard, FIG. 1 is a diagram of an augmented reality system 10 comprising a head-mounted display (HMD) 12 being worn by a user 14 in an environment 16. The HMD 12 has head-wearable frame 17 for supporting a lens 18 that defines a user field of view (FOV) 20 for the user 14 to view a live scene 22. As will be discussed below in detail with respect to FIG. 5, the lens 18 in this embodiment has an exterior surface 24 that is transmissive to light to provide a real-world portion 26 of the live scene 22, and an interior surface 28 that is reflective to light. As will be discussed in detail below, a virtual image portion (not shown) is provided to the interior surface 28 of the lens 18, so that the virtual image portion (not shown) overlays an IR portion 30 of the live scene 22. The IR portion 30 in this embodiment is the portion of the live scene 22 that contains a view of an IR reflective material 32.

The environment 16 in this embodiment contains a mock-up of a helicopter interior 34 including a cockpit interior 36 with a window region 38, seats 40, a center console 42, flight controls 44, a dashboard 46, and overhead displays 48, etc. In this embodiment, the user 14 is a passenger user ("passenger user 14" hereinafter) seated in the helicopter interior 34 behind a pilot user 50. For the purposes of this example, reference will be made to the live scene 22 being viewed by the passenger user 14. It should be understood, however, that the pilot user 50 may also be a participant in the helicopter simulation environment 16 and may also be wearing another HMD for providing an independent augmented reality scene 52 to the pilot user 50. From the perspective of the forward facing passenger user 14, the user FOV 20 of the passenger user 14 wearing the HMD 12 defines the live scene 22. The live scene 22 has an IR portion 30 that includes a portion of the window region 38 that is covered with the IR reflective material 32 in the background. The live scene 22 also has a real-world portion 26 that includes a portion of the dashboard 46 in the background and the pilot user 50 in the foreground, with the pilot user 50 in a line of sight between a portion of the dashboard 46, the window region 38, and the HMD 12, thereby partially obstructing the portion of the dashboard 46 and the window region 38.

By illuminating the IR reflective material 32 of the window region 38 with IR light of a predetermined wavelength, the IR reflective material 32 reflects a greater amount of IR light than the other parts of the helicopter interior 34 that have less IR reflectivity. The increased IR reflection by the IR reflective material 32 is not detectable by the passenger user 14 viewing the live scene 22, however, because IR light is outside the visible spectrum.

Figure 2:
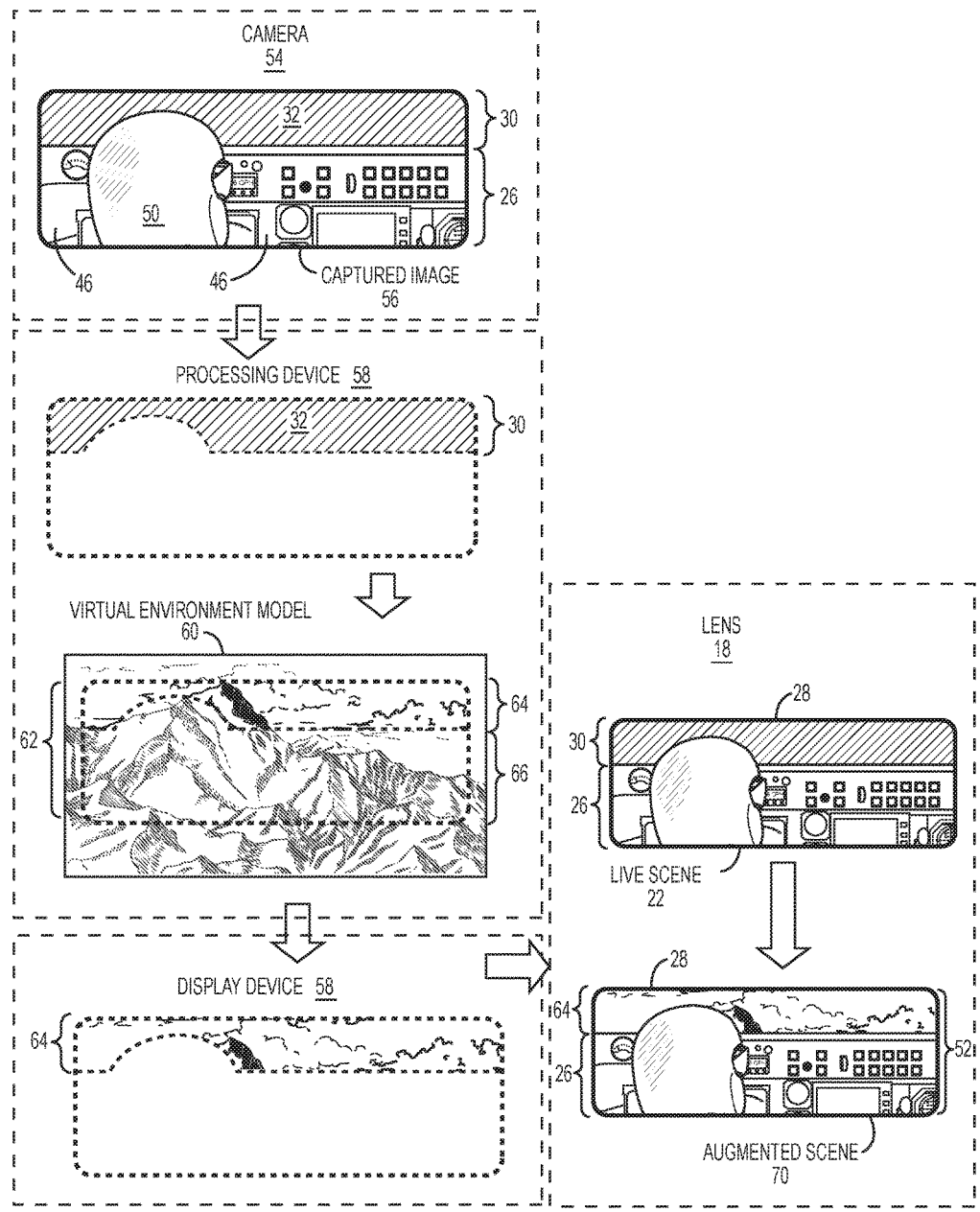
FIG. 2 is a diagram of a process for providing a virtual image corresponding to an infrared portion of a live scene of the environment of FIG. 1.

Turning now to FIG. 2, a diagram is provided illustrating an augmented reality scene 52 to the passenger user 14 according to the embodiment of FIG. 1. In this embodiment, the HMD 12 includes a camera 54 having a camera FOV that is registered to the user FOV 20 (not shown). The camera 54 captures an image 56 ("captured image 56" hereinafter) registered to the live scene 22 being viewed by the passenger user 14, and from the same perspective as the passenger user 14. For example, as with the live scene 22, the captured image 56 includes the same view of portions of the dashboard 46 and window region 38 in the background, and the same view of the pilot user 50 in the foreground partially obstructing a portion of the dashboard 46 and window region 38. The higher levels of IR light being reflected by the window region 38 are detected by an image sensor (not shown) of the camera 54, even though the IR light is not visible to the passenger user 14.

A processing device 58 associated with the HMD 12 determines the IR portion 30 of the live scene 22 by detecting the portions of the captured image 56 indicative of reflected IR light above a predetermined threshold. The threshold may include a brightness threshold, a temperature threshold, and/or another parameter associated with IR light.

The processing device 58 next associates the IR portion 30 with a virtual environment model 60, such as an out-the-window (OTW) image including outdoor scenery. In this embodiment, the processing device 58 is integrated into the HMD 12, but it should be understood that the processing device 58 may operate remotely from the HMD 12, such as via a network. The processing device 58 determines a virtual scene 62 within the virtual environment model 60 based on data associated with the simulation, the viewing position and orientation of the passenger user 14, and the live scene 22. The processing device 58 crops the virtual scene 62 to create a virtual image 64 corresponding to the shape of the IR portion 30 of the live scene 22, with a cropped portion 66 of the virtual environment model 60 omitted from the virtual image 64 so as to not overlay the real-world portion 26 of the live scene 22. The virtual image 64 is then provided to a display device 68 associated with the HMD 12, which in turn projects the virtual image 64 onto the interior surface 28 of the lens 18. The virtual image 64 overlays the IR portion 30 of the live scene 22 on the interior surface 28 of the lens 18, thereby providing an augmented scene 70 to the passenger user 14.

Unlike conventional chroma key compositing techniques, the embodiment of FIGS. 1 and 2 is particularly well-suited to see-through displays, such as the lens 18 of the HMD 12. As discussed above, conventional chroma key compositing processes a first image containing one or more objects having a monochrome background of a predetermined color (typically blue or green), and generates a composite image that replaces the monochrome portion of the first image with corresponding portions of a second image. However, when this technique is applied to a see-through display, such as the lens 18 of the HMD 12 of FIGS. 1 and 2, the bright monochrome background in the live scene 22 tends to bleed through the virtual image 64 through the lens 18, thereby causing the virtual image 64 to appear washed out, tinted, and artificial.

In the embodiment of FIGS. 1 and 2, on the other hand, the IR portion 30 may contain wavelengths in the infrared spectrum reflected at relatively high intensity, while remaining invisible to the passenger user 14. Thus, the IR light from the IR portion 30 does not affect or interfere with the passenger user 14 viewing the virtual image 64, which is registered by the HMD 12 to the IR portion 30 as part of the augmented scene 70. In some embodiments, the IR reflective material 32 may also include a material or surface that is absorbent to visible light while remaining reflective of infrared light. In this manner, the amount of visible light passing through the portion of the lens 18 corresponding to the IR portion 30 of the live scene 22 is minimized while still reflecting a large amount of infrared light. This reduction in visible light reaching the portion of the exterior surface 24 of the lens 18 corresponding to the IR portion 30 has the effect of reducing the translucency of reflections from the interior surface 28 of the lens 18 configured to overlay the IR portion 30 in the augmented scene 70, thereby allowing the virtual image 64 to overlay the IR portion 30 of the live scene 22 within the augmented scene 70 as a substantially opaque image.

Different types of IR wavelengths or bands may be used, including wavelengths and bands within the SWIR, MWIR, and LWIR bands. It should also be understood that other bands within the EMR spectrum may be used in place of IR light, such as, without limitation, ultraviolet (UV) light, corresponding to electromagnetic wavelengths between 100 nm and 400 nm.

In an alternative embodiment, the window region 38 of the helicopter interior 34 may be an actual window with the IR reflective material 32 being disposed on an external object, such as a wall. In this embodiment, the environment 16 outside the helicopter interior region 34 may be illuminated with IR light, which is reflected by the IR reflective material 32 into the helicopter interior region 34 through the window region 38 from outside the helicopter interior region 34. This embodiment may reduce computational cost because the IR light source is located outside the helicopter interior region 34 (i.e., the helicopter model). This in turn may improve the ability of the camera 54 to distinguish between the window region 38, through which the external IR light is visible, and the helicopter interior region 34, which is subjected to significantly less stray IR light from the external IR light source and allows for the camera 54 to more easily distinguish between the illuminated window region 38 and the less-illuminated helicopter interior region 34. As discussed above, when the camera 54 captures the captured image 56, the IR portion 30 corresponds to the portion of the IR reflective material 32 that is visible through the window region 38 from the user FOV 20.

Figure 3:
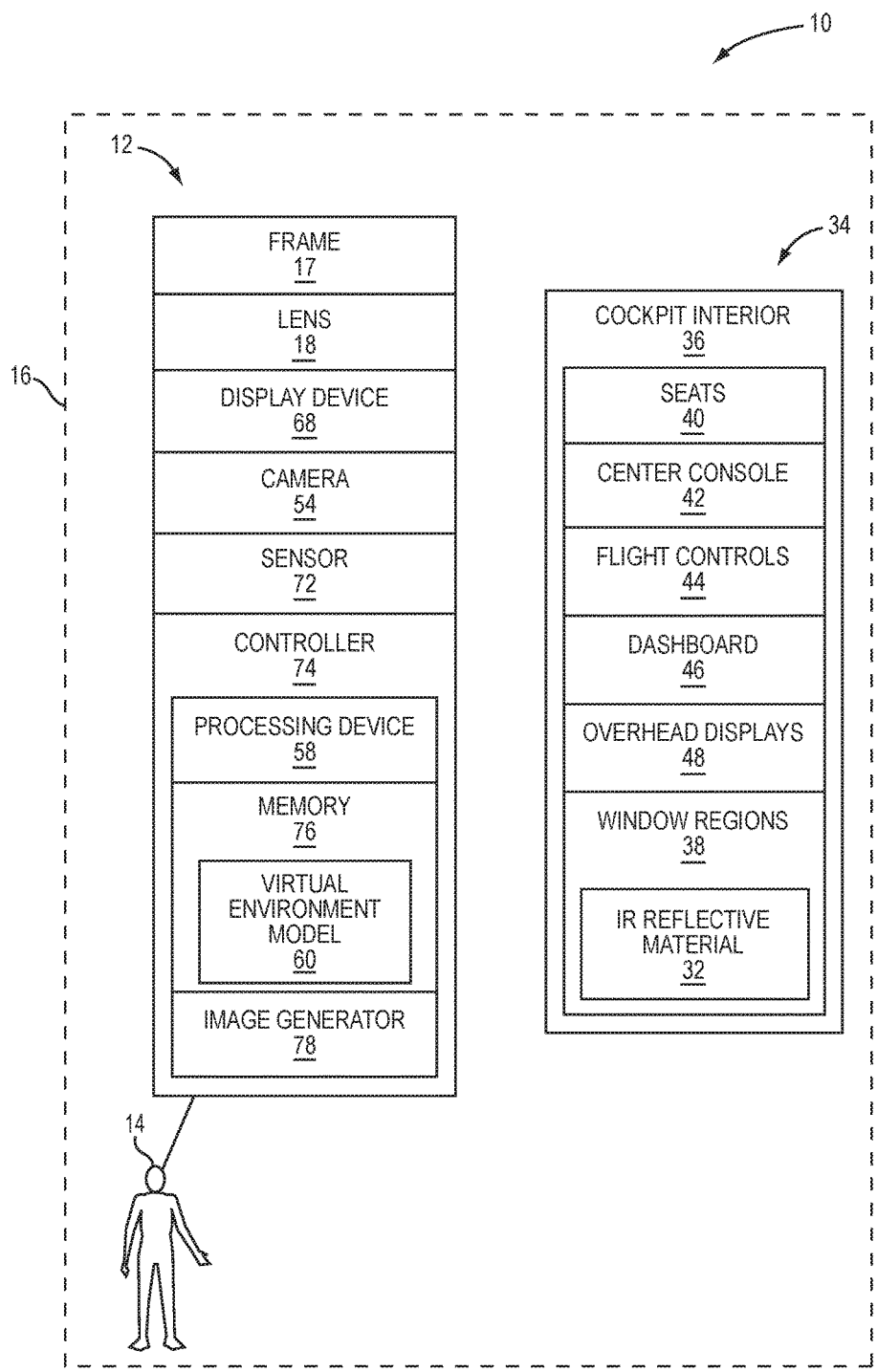
FIG. 3 is a diagram of an environment in which embodiments may be practiced, including the embodiment of FIGS. 1 and 2.

Referring now to FIG. 3, a block diagram of the environment 16 of FIG. 1 in which embodiments may be practiced is illustrated. In this embodiment, the environment 16 includes the augmented reality system 10, including the helicopter interior 34 and the passenger user 14 wearing the HMD 12. The HMD 12 includes the head-wearable frame 17 that is configured to be worn by the passenger user 14. By way of non-limiting example, the head-wearable frame 17 may comprise any suitable structure that is capable of positioning one or more lenses 18 with respect to the eyes of the passenger user 14. The head-wearable frame 17, in one embodiment, may comprise an eyeglasses frame that couples to the head of the passenger user 14 via two extensions, or arms, that are supported by the ears of the passenger user 14, and a bridge that is supported by the nose of the passenger user 14. In another embodiment, the head-wearable frame 17 may comprise a flight helmet that is supported by the head of the passenger user 14.

While for purposes of discussion the lens 18 may be referred to in the singular, in some embodiments the lens 18 comprises two lenses: a right eye lens 18 and a left eye lens 18. In such embodiments, each lens 18 may have a FOV, which may be referred to as a right eye FOV and a left eye FOV, respectively. The right eye FOV and the left eye FOV collectively define an overall FOV corresponding to the user FOV 20 for the augmented reality system 10. There may be overlap between the right eye FOV and the left eye FOV, with appropriate overlapping imagery generated for each eye.

The augmented reality system 10 may also include a sensor 72 configured to generate sensor data that changes in response to movements of the head of the passenger user 14. In this embodiment, the sensor 72 may comprise any suitable sensor subsystem that is capable of generating data from which a location and an orientation of the head of the passenger user 14 can be determined. In another embodiment, the sensor 72 comprises an inertial measurement unit (IMU) that is coupled to the head-wearable frame 17. In some embodiments, the sensor 72 is configured to generate sensor data from which rotational and/or translational acceleration of the head of the passenger user 14 may be derived to facilitate predictions of head motion, to help reduce latency and/or lag in the imagery as the head of the passenger user 14 moves. In this manner, the sensor 72 allows the processing device 58 to determine a relative position and orientation of the user FOV 20 and determine a virtual FOV within the virtual environment model 60 based on the relative position and orientation of the user FOV 20, the virtual FOV defining a virtual scene 73. The processing device 58 is then able to determine a portion of the virtual scene 73 registered to the IR portion 30 of the live scene 22 to generate the virtual image 64.

A controller 74 provides various functionalities to the augmented reality system 10, as discussed in detail herein, and is coupled to the camera 54, the sensor 72, and/or to the display device 68. The controller 74 includes one or more processing devices 58 and a memory 76. At least some of the functionality provided herein may be provided via computer instructions that are stored in the memory 76 and executed by the processing device 58.

An image generator (IG) 78 generates the virtual image 64 corresponding to OTW imagery of a virtual environment that is presented to the passenger user 14 based at least in part on the virtual environment model 60 that is stored in the memory 76. The virtual environment model 60 contains data that defines the virtual environment, such as the visible surfaces and/or objects in the virtual environment, the states, attributes and characteristics thereof, as well as attributes and characteristics of the simulated vehicle, such as direction, altitude, speed, and the like. As will be discussed in greater detail below, the IG 78 determines a current FOV of the augmented reality system 10 based at least in part on the FOV of the lens 18 and the orientation and/or location of the head of the passenger user 14, accesses the virtual environment model 60 to determine the state of the virtual environment at that moment in time, and generates the virtual image 64. The virtual image 64 is then provided to the display device 68 for presentation to the passenger user 14. This process happens iteratively at a particular frame rate, such as, by way of non-limiting example, 30, 60, or 120 frames per second, even as the virtual environment may be concurrently changing, such that objects depicted within the virtual image 64 are moving with respect to the simulated vehicle. For example, the virtual image 64 may depict imagery that moves with respect to the helicopter interior region 34 as if the passenger user 14 were traveling in a moving helicopter. While for purposes of illustration the IG 78 is illustrated as being a component or element within the controller 74, this is merely one embodiment, and in other embodiments, the IG 78 may be separate from the controller 74 and may communicate with the controller 74 via a communications path.

While for purposes of illustration the virtual environment model 60 is illustrated as being maintained in the memory 76 of the controller 74, in other embodiments, the virtual environment model 60 may be maintained external to the augmented reality system 10. In particular, the virtual environment model 60 may be maintained by a device that is communicatively coupled to the augmented reality system 10, and to one or more other simulators, via a network, to allow for a multi-user simulation wherein other simulation systems, including possibly other augmented reality systems 10, access the virtual environment model 60 concurrently with the augmented reality system 10.

In one embodiment, the augmented reality system 10 has an ultra-wide user FOV 20, such as in excess of 100 degrees. As discussed above, the augmented reality system 10 also includes a display device 68 that is mapped to the interior surface 28 of the lens 18. In some embodiments, the augmented reality system 10 may comprise or include one or more components of the head-mounted display device described in U.S. Pat. No. 8,781,794 B2, entitled "METHODS AND SYSTEMS FOR CREATING FREE SPACE REFLECTIVE OPTICAL SURFACES," filed on Aug. 17, 2011 and U.S. Patent Application Publication No. 2012/0120498 A1, entitled "HEAD-MOUNTED DISPLAY APPARATUS EMPLOYING ONE OR MORE FRESNEL LENSES," filed on Aug. 17, 2011, each of which is hereby incorporated by reference herein.

The controller 74, via the IG 78, accesses the virtual environment model 60 and generates the virtual image 64, which visually depicts that portion of the virtual environment that is within the window region 38 of the user FOV 20. The IG 78 provides the virtual image 64 to the display device 68 to cause the display device 68 to emit light in accordance with the virtual image 64 toward the interior surface 28 of the lens 18, which is reflected into the eyes 82 of the passenger user 14. As noted above, the IR reflective material 32 of the window region 38 may be absorbent of visible light in addition to being reflective of infrared light, in order to reduce the translucency of reflections from the interior surface 28 of the lens 18.

As discussed above, the environment 16 in this embodiment contains a helicopter interior 34 including a cockpit interior 36, but it should be understood that other types of simulation environments 16 are contemplated. The helicopter interior 34 may also include lighting features to properly simulate the look of the helicopter interior 34 as if the passenger user 14 were in the vehicle being simulated. The cockpit interior 36 includes seats 40, a center console 42, flight controls 44, a dashboard 46, overhead displays 48, and a window region 38 having IR reflective material 32. In some embodiments, an actual aircraft may be used in a darkened hanger or other location, or which has a darkening material having an IR reflective material 32 placed over the window region 38 on the exterior or interior of the cockpit interior 36.

The process described above occurs at the particular frame rate of the augmented reality system 10, such as 30 frames per second. The sensor 72 generates sensor data that changes responsive to movements of the HMD 12, such as when the passenger user 14 moves his head, and thus, the particular virtual image 64 and the real-world portion 26 of the augmented scene 70 may continually change, as may happen if the actual vehicle being simulated were in motion.

Figure 4:
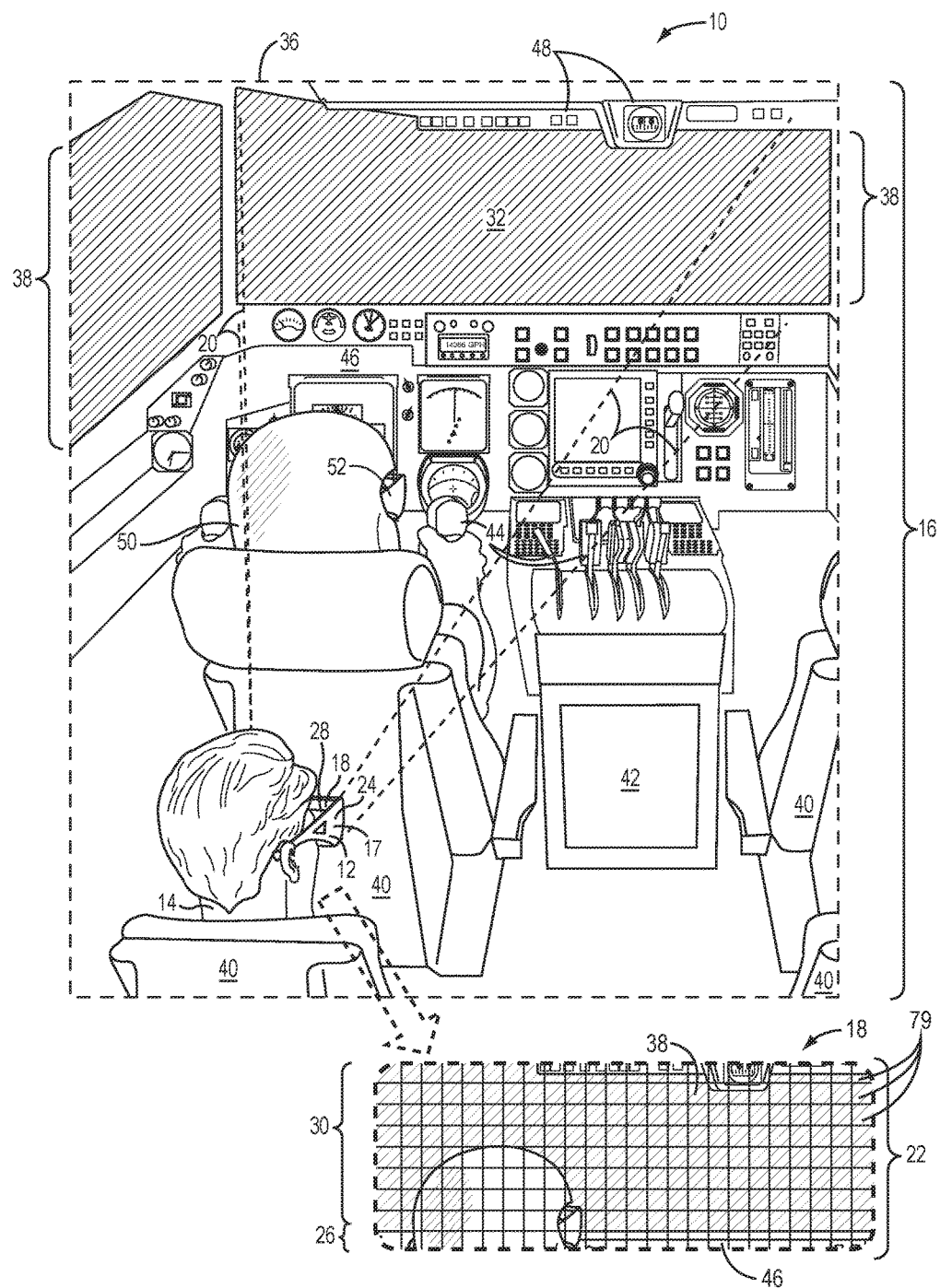
FIG. 4 is a block diagram of the environment during the simulation illustrated in FIG. 1, at a subsequent point in time to that illustrated in FIG. 1.

In this regard, FIG. 4 is a diagram of the environment 16 during the simulation illustrated in FIG. 1, at a subsequent point in time to that illustrated in FIG. 1. In this embodiment, the live scene 22 is divided among a plurality of pixels 79. Each pixel 79 is mapped to a corresponding portion of the interior surface 28 of the lens 18. The display device 68 can thus precisely project the virtual image 64, on a pixel-by-pixel basis, in a way that each pixel 79 is projected precisely on a predetermined location of the interior surface 28 of the lens 18 such that the virtual image 64 will be reflected into the eye 82 of the passenger user 14. In this example, the virtual image 64 is projected from a portion of the pixels 79 of the display device 68 (not shown) corresponding to the IR portion 30 of the live scene 22. To help facilitate the view of the real-world portion 26 of the live scene 22 within the augmented scene 70, the display device 68 may turn off the pixels 79 corresponding to the real-world portion 26, to reduce reflections from the interior surface 28 of the lens 18 other than the portion from which the virtual image 64 is reflected. It should be understood that other methods may be used to provide the virtual image 64 to the interior surface 28 of the lens 18. For example, in some embodiments, the lens 18 may contain an integrated display device 68 (not shown), such as, for example, a see-through liquid crystal display (LCD). This embodiment enables direct view of the LCD display device 68 embedded within the lens 18 in the user FOV 30, rather than a reflected view of the interior surface 28 of the lens 18.

To display the virtual image 64, the processing device 58 determines, for each pixel 79 (or other type of predefined section) of the captured image 56, whether an IR brightness (or other parameter), is above the predetermined IR brightness threshold (or other threshold). The processing device 58 (not shown) registers each pixel 79 of the captured image 56 having an IR brightness above the IR brightness threshold to the IR portion 30 of the live scene 22.

Based on the processing device 58 determining the IR portion 30, the IG 78 determines a subset of pixels 79 of the display device 68 that corresponds to the IR portion 30 of the live scene 22. The IG 78 causes the subset of pixels 79 in the display device 68 to emit light in accordance with the virtual image 64 toward the interior surface 28 of the lens 18 so that the virtual image 64 is registered to the IR portion 30 of the live scene 22, thereby causing the virtual image 64 to overlay the IR portion 30 in the user FOV 20.

Again, while for purposes of discussion, the display device 68 may be referred to in the singular, in some embodiments the display device 68 comprises two display apparatuses: a right eye display apparatus that is mapped to the right eye lens 18, and a left eye display apparatus that is mapped to the left eye lens 18. Each pixel 79 of a respective display device 68 is mapped to a particular location on the interior surface 28 of a corresponding lens 18, such that light emitted from such pixel 79 will be reflected toward the eye 82 of the passenger user 14 from that particular location on the interior surface 28 of the corresponding lens 18. For example, each pixel 79 in the right eye display apparatus is mapped to a particular location on the interior surface 28 of the right eye lens 18. Light emitted from a respective pixel 79 of the right eye display device 68 is reflected from the particular location on the interior surface 28 of the right eye lens 18 that corresponds to that pixel 79 into the corresponding right eye 82 of the passenger user 14. Light emitted from other pixels 79 that do not correspond to that particular location on the interior surface 28 of the right eye lens 18 is not reflected into the right eye 82 of the passenger user 14 from that particular location of the interior surface 28 of the right eye lens 18. Similarly, the pixels 79 of the left eye display device 68 are mapped to particular locations on the interior surface 28 of the left eye lens 18.

In one embodiment, the controller 74 first generates FOV imagery that includes all objects in the virtual environment model 60 that would come within the entire user FOV 20. The location and orientation of the head of the passenger user 14 is used to generate a stencil that is used to modify the FOV imagery to remove, or mask, all FOV imagery that would overlay the real-world portion 26 that would otherwise be within the user FOV 20, to generate the virtual image 64. The virtual image 64 is then provided to the display device 68.

Figure 5:
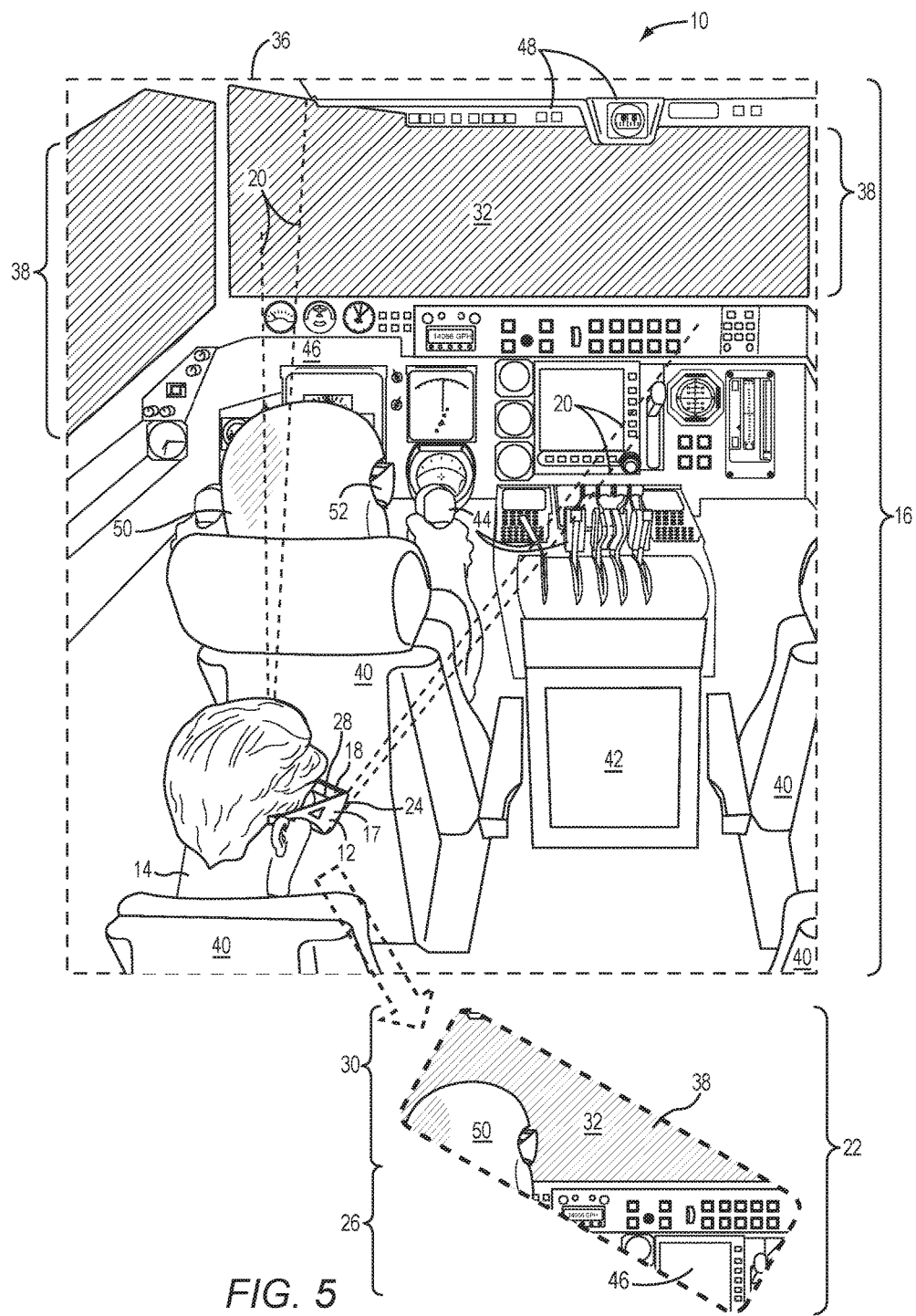
FIG. 5 is a diagram of the environment during the simulation illustrated in FIGS. 1 and 4, at a subsequent point in time to that illustrated in FIGS. 1 and 4.

Referring now to FIG. 5, a diagram of the environment 16 during the simulation illustrated in FIG. 1 is depicted at a subsequent point in time. In this example, the passenger user 14 has tilted his head, thereby tilting the HMD 12. As the HMD 12 tilts, the camera 54 (not shown) continually captures images 56 and the sensor 72 continually generates sensor data that identifies a location and orientation of the head of the passenger user 14 in relation to the virtual environment model 60. The controller 74 (not shown) determines the live scene 22 based on the captured image 56. The live scene 22 includes the window region 38 defining the IR portion 30, and a portion of the dashboard 46 and pilot user 50 defining the real-world portion 26. The controller 74, via the IG 78 (not shown), accesses the virtual environment model 60 and generates virtual image 64, which visually depicts that portion of the virtual environment that is within the window region 38. The IG 78 provides the virtual image 64 to the display device 68 to cause the display device 68 to emit light in accordance with the virtual image 64 toward the interior surface 28 of the lens 18, which is reflected into the eyes of the passenger user 14.

In one embodiment, the camera 54 may provide some or all of the functionality of the sensor 72. For example, the camera 54 may capture landmarks within the captured image 56 that can be correlated to real-time positions and orientations of the HMD 12 by the processing device 58. These landmarks could be features in the cockpit interior 36, for example, or could be fiducial markers, i.e., objects positioned in the camera FOV for use as a point of reference.

Figure 6:
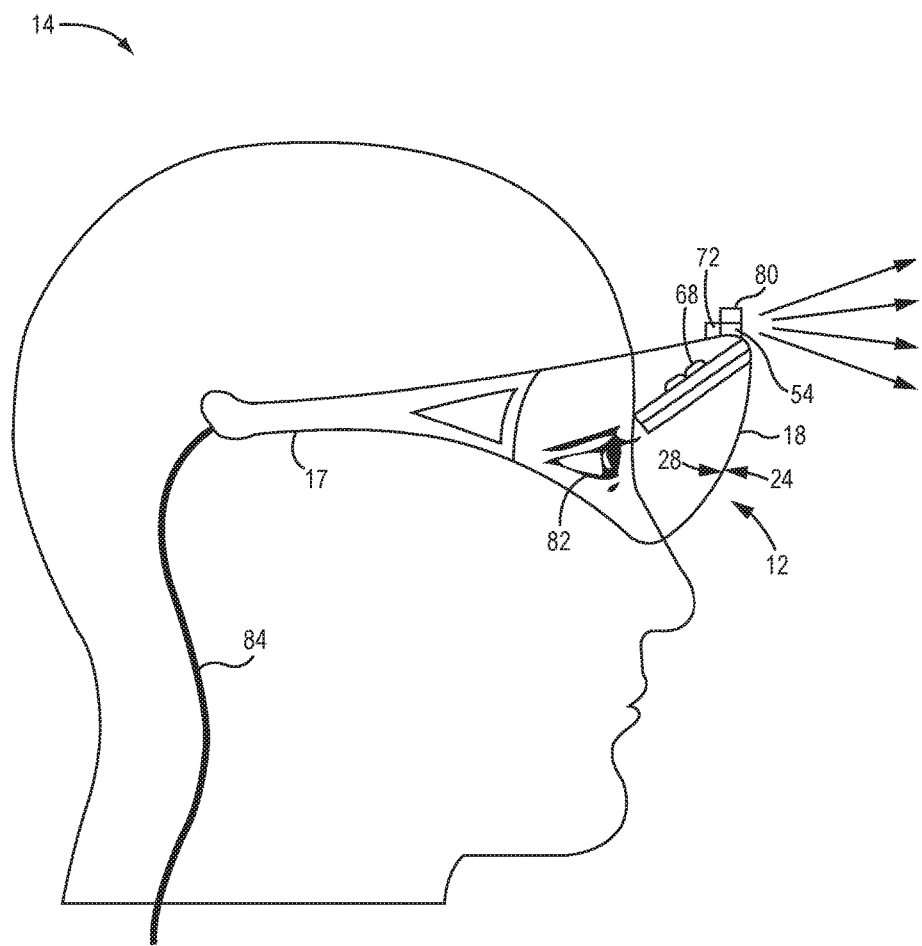
FIG. 6 is a diagram of a head-mounted display for an augmented reality system according to an embodiment.

FIG. 6 is a diagram of the HMD 12 according to one embodiment. In this embodiment, the camera 54 and/or sensor 72 (not shown) may be coupled directly to the head-wearable frame 17. The head-wearable frame 17 may also include an IR light source 80 configured to shine IR light on a portion of the helicopter interior region 34 within the user FOV 20, including the IR reflective material 32 in the window region 38. As discussed above, the IR reflective material 32 may be configured to reflect more IR light than the other regions of the helicopter interior 34, thereby allowing the camera 54 to capture a captured image 56 having data indicative of a clearly defined and easily detectible IR portion 30 within the live scene 22.

The display device 68 is positioned above an eye 82 of the passenger user 14 and oriented such that the display device 68 can project light onto the interior surface 28 of the lens 18. A cable 84 may provide a path for communications between the camera 54, sensor 72, display device 68, and the controller 74 (not shown), as well as power for the camera 54, sensor 72, and/or display device 68, as needed.

It should be understood that the HMD 12 may alternatively be configured as a more fully immersive display. In this regard, the lens 18 may be opaque to visible light, such that the only imagery in the user FOV 20 would be the virtual image 64 being reflected by the interior surface 28 of the lens 18. Alternatively, the lens 18 could be substituted with a mirror (not shown). In this embodiment, the entire augmented scene 70 would be provided to the interior surface 28 of the lens 18 by the display device 68, with the augmented scene 70 including the virtual image 64 combined with the real-world portion 26 of the captured image 56, rather than the actual view of the real-world portion 26. In this embodiment, the real-world portion 26 of the captured image 56 is composited with the virtual image 64 to create a composite image corresponding to the augmented scene 70. The composite image of the augmented scene 70 is then provided to the reflective interior surface 28 of the lens 18. In this embodiment, the camera 54 may be configured to capture the captured image 56 in the visibile spectrum and the IR spectrum simultaneously, or multiple cameras 54 could be used. In this embodiment, a first camera 54 is configured to capture the captured image 56 in the visible spectrum to provide the real-world portion 26 to the IG 78, and a second camera 54 (having substantially the same camera FOV) is configured to capture the IR portion 30 of the captured image 56 so that the virtual image 64 can be composited with the real world portion 26 of the captured image 56.

Figure 7:
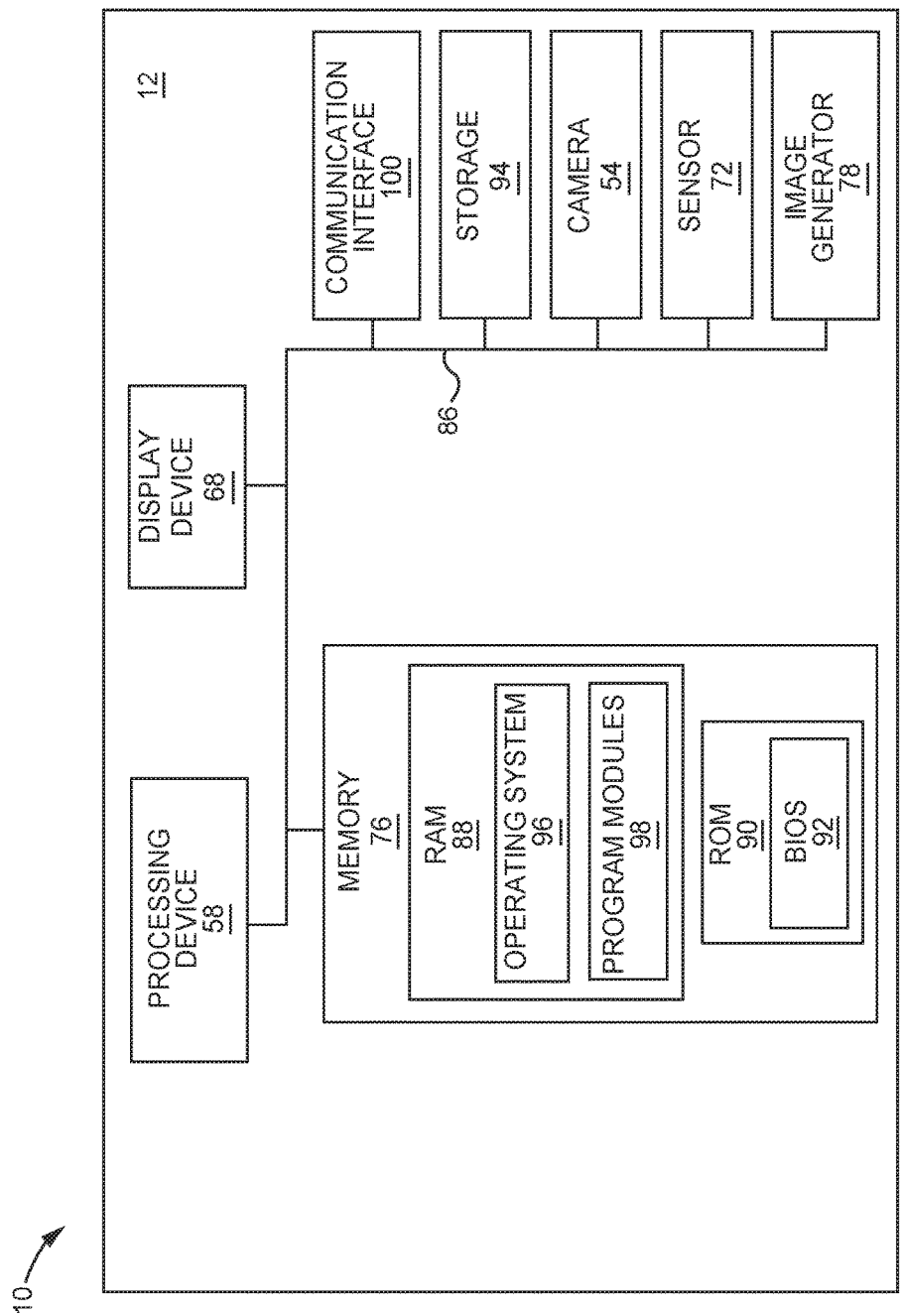
FIG. 7 is a block diagram of the augmented reality system according to an embodiment.

FIG. 7 is a block diagram of the augmented reality system 10 according to one embodiment. As discussed above, the augmented reality system 10 may have any desirable form factor, such as, by way of a non-limiting example, a flight helmet or head-wearable frame 17. The augmented reality system 10 includes the processing device 58, the memory 76, and a system bus 86. The system bus 86 provides an interface for system components including, but not limited to, the memory 76, the processing device 58, the display device 68, the camera 54, the sensor 72, etc. The processing device 58 can be any commercially available or proprietary processing device or processing devices.

The system bus 86 may be any of several types of bus structures that may further interconnect to a memory bus (with or without a memory controller), a peripheral bus, and/or a local bus using any of a variety of commercially available bus architectures. The memory 76 may include a volatile memory 88 (e.g., random access memory (RAM)) and/or a non-volatile memory 90 (e.g., read only memory (ROM), erasable programmable read only memory (EPROM), electrically erasable programmable read only memory (EEPROM), etc.). A basic input/output system (BIOS) 92 may be stored in the non-volatile memory 90, and can include the basic routines that help to transfer information between elements within the augmented reality system 10. The volatile memory 88 may also include a high-speed RAM, such as static RAM for caching data.

The augmented reality system 10 may further include or be coupled to a computer-readable storage 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 94 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as floppy disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 94 and in the volatile memory 88, including an operating system 96 and one or more program modules 98, which may implement the functionality described herein in whole or in part. It is to be appreciated that the embodiments can be implemented with various commercially available operating systems 96 or combinations of operating systems 96.

A portion of the embodiments may be implemented as a computer program product stored on a transitory or non-transitory computer-usable or computer-readable storage medium, such as the computer-readable storage 94, which includes complex programming instructions, such as complex computer-readable program code, configured to cause the processing device 58 to carry out the steps described herein. Thus, the computer-readable program code can comprise software instructions for implementing the functionality of the embodiments described herein when executed on the processing device 58. The processing device 58, in conjunction with the program modules 98 in the volatile memory 88, and in some embodiments the IG 78, may serve as the controller 74 for the augmented reality system 10 that is configured to, or adapted to, implement the functionality described herein.

The augmented reality system 10 may also include a communication interface 100, suitable for communicating with a network as appropriate or desired. The IG 78 may comprise any suitable proprietary or off-the-shelf IG, such as an NVIDIA® or AMD® graphics card.

Figure 8:
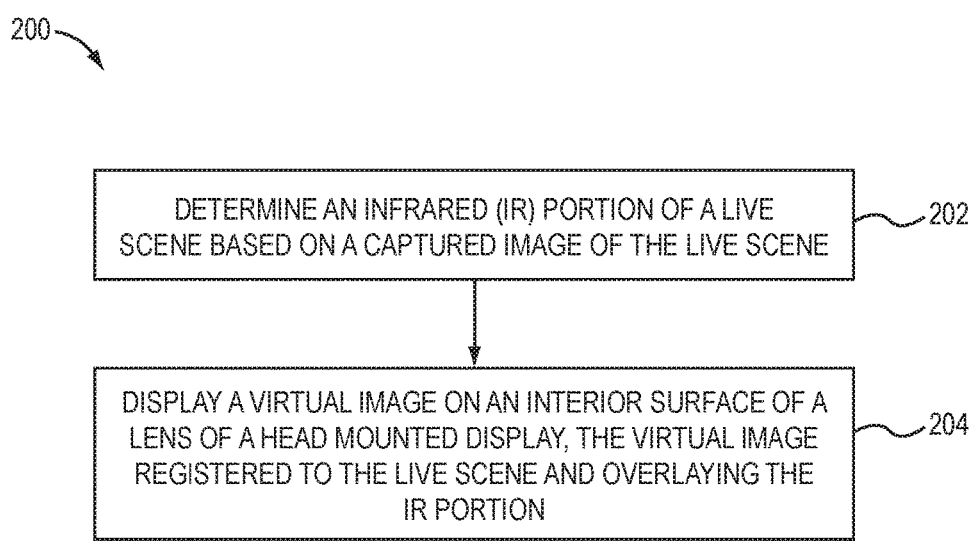
FIG. 8 is a flowchart of a method for providing a virtual image to an HMD according to an embodiment.

FIG. 8 is a flowchart of a method 200 for providing the virtual image 64 to the HMD 12 of FIGS. 1-3 according to one embodiment, and will be discussed in conjunction with FIGS. 1-3. The method 200 includes determining an IR portion 30 of a live scene 22 based on a captured image 56 of the live scene 22 (block 202). As discussed above, the live scene 22 corresponds to the user FOV 20 defined by the lens 18 of the HMD 12. The method 200 further includes displaying, via the display device 68 of the HMD 12, the virtual image 64 on the interior surface 28 of the lens 18 (block 204). As discussed in detail above, the virtual image 64 is registered to the IR portion 30 of the live scene 22 based on the captured image 56, with the virtual image 64 overlaying the IR portion 30 of the live scene 22 in the user FOV 20.

Those skilled in the art will recognize improvements and modifications to the preferred embodiments of the disclosure. All such improvements and modifications are considered within the scope of the concepts disclosed herein and the claims that follow.

What is claimed is:

1. A head-mounted display (HMD) comprising:
a head-wearable frame configured to be worn by a user;
a lens coupled to the frame, the lens defining a user field of view (FOV), the lens comprising an interior surface configured to face the user;
a camera coupled to the frame, the camera having a camera FOV registered to the user FOV, the camera configured to capture a captured image of a live scene corresponding to the user FOV, the captured image comprising data indicative of an IR portion of the live scene, the IR portion comprising an infrared (IR) light in a predetermined IR wavelength band reflected above a predetermined threshold;
a processing device configured to:
    detect the IR portion of the live scene based on the captured image;
    determine the virtual image based on the IR portion by:
        determining a relative position and orientation of the user FOV;
        determining a virtual FOV within a virtual environment model based on the relative position and orientation of the user FOV, the virtual FOV defining a virtual scene; and
        registering a portion of the virtual scene to the IR portion of the live scene to determine the virtual image; and
a display device configured to display the virtual image on the interior surface of the lens, the virtual image registered to the IR portion of the live scene based on the captured image, the virtual image configured to overlay the IR portion of the live scene in the user FOV.

2. The HMD of claim 1, wherein the predetermined threshold is an IR brightness threshold, the processing device further configured to:
determine, for a plurality of predefined sections of the captured image, whether an IR brightness of each section in the predetermined IR wavelength band is above the IR brightness threshold; and
register each section of the captured image having an IR brightness above the IR brightness threshold to the IR portion of the live scene.

3. The HMD of claim 2, wherein the plurality of predefined sections of the captured image is a plurality of pixels, each pixel mapped to a predetermined location of the interior surface of the lens.

4. The HMD of claim 1, wherein the interior surface of the lens comprises a reflective surface, and
wherein the display device is configured to project the virtual image on the reflective surface of the lens, the virtual image configured to overlay the IR portion of the live scene.

5. An augmented reality system comprising:
a head-mounted display (HMD) comprising:
    a head-wearable frame configured to be worn by a user;
    a lens coupled to the frame, the lens defining a user field of view (FOV), the lens comprising an interior surface configured to face the user;
    a camera coupled to the frame, the camera having a camera FOV registered to the user FOV, the camera configured to capture a captured image of a live scene corresponding to the user FOV; and
    a display device configured to display a virtual image on the interior surface of the lens;
a simulation environment comprising an infrared (IR) reflective surface disposed in the live scene, the IR reflective surface configured to reflect IR light to define an IR portion of the live scene; and
a processing device configured to:
    detect the IR portion of the live scene based on the captured image by:
        determining, for a plurality of predefined sections of the captured image, whether an IR brightness of each section in a predetermined IR wavelength band is above an IR brightness threshold; and
        registering each section of the captured image having an IR brightness above the IR brightness threshold to the IR portion of the live scene; and
    determine the virtual image based on the IR portion;
wherein the virtual image is registered to the IR portion of the live scene on the interior surface of the lens, the virtual image configured to overlay the IR portion of the live scene in the user FOV.

6. The augmented reality system of claim 5, wherein the IR reflective surface in the live scene comprises a window region of the simulation environment.

7. The augmented reality system of claim 5, further comprising an object disposed in the live scene in a line of sight between a portion of the IR reflective surface in the live scene and the HMD.

8. The augmented reality system of claim 5, wherein the IR reflective surface in the live scene is configured to reduce a translucency of the virtual image.

9. The augmented reality system of claim 8, wherein the IR reflective surface in the live scene is configured to absorb visible light to reduce the translucency of the virtual image.

10. The augmented reality system of claim 5, wherein the plurality of predefined sections of the captured image is a plurality of pixels, each pixel mapped to a predetermined location of the interior surface of the lens.

11. The augmented reality system of claim 1, wherein the interior surface of the lens comprises a reflective surface, and
wherein the display device is configured to project the virtual image on the reflective surface of the lens, the virtual image configured to overlay the IR portion of the live scene.

12. A method of providing a virtual image to a head-mounted display (HMD), the method comprising:
determining an infrared (IR) portion of a live scene based on a captured image of the live scene, the live scene corresponding to a user field of view (FOV) defined by a lens of the HMD, the IR portion comprising IR light in a predetermined IR wavelength band reflected above a predetermined threshold;

determining a relative position and orientation of the user FOV;

determining a virtual FOV within a virtual environment model based on the relative position and orientation of the user FOV, the virtual FOV defining a virtual scene;

registering a portion of the virtual scene to the IR portion of the live scene to determine the virtual image; and displaying, via a display device of the HMD, the virtual image on an interior surface of the lens, the virtual image registered to the IR portion of the live scene based on the captured image, the virtual image configured to overlay the IR portion of the live scene in the user FOV.

13. The method of claim 12, wherein the IR portion corresponds to an IR reflective surface disposed in the live scene, the IR reflective surface configured to reflect IR light in the predetermined IR wavelength band.

14. The method of claim 13, further comprising an object disposed in the live scene in a line of sight between a portion of the IR reflective surface in the live scene and the HMD.

15. The method of claim 13, wherein the IR reflective surface in the live scene is configured to reduce a translucency of the virtual image overlaying the IR portion of the live scene in the user FOV.

16. The method of claim 15, wherein the IR reflective surface in the live scene is configured to absorb visible light to reduce the translucency of the virtual image overlaying the IR portion of the live scene in the user FOV.

17. A head-mounted display (HMD) comprising:

a head-wearable frame configured to be worn by a user;

a lens coupled to the frame, the lens defining a user field of view (FOV), the lens comprising an interior surface configured to face the user;

a camera coupled to the frame, the camera having a camera FOV registered to the user FOV, the camera configured to capture a captured image of a live scene corresponding to the user FOV, the captured image comprising data indicative of an IR portion of the live scene, the IR portion comprising an infrared (IR) light in a predetermined IR wavelength band reflected above an IR brightness threshold;

a processing device configured to:

determine, for a plurality of predefined sections of the captured image, whether an IR brightness of each section in the predetermined IR wavelength band is above the IR brightness threshold;

register each section of the captured image having an IR brightness above the IR brightness threshold to the IR portion of the live scene; and determine the virtual image based on the IR portion; and a display device configured to display the virtual image on the interior surface of the lens, the virtual image registered to the IR portion of the live scene based on the captured image, the virtual image configured to overlay the IR portion of the live scene in the user FOV.

* * * * *